United States Patent [19]

Ohira et al.

[11] Patent Number: 5,404,261
[45] Date of Patent: Apr. 4, 1995

[54] TAPE CASSETTE HAVING FRONT AND REAR RIDS FOR THE TAPE AND A ROTATABLE LEVER CONNECTING THE RIDS

[75] Inventors: Tsunehisa Ohira, Sagamihara; Manabu Sato, Yokohama, both of Japan

[73] Assignee: Victor Company of Japan, Ltd., Yokohama, Japan

[21] Appl. No.: 980,978

[22] Filed: Nov. 24, 1992

[30] Foreign Application Priority Data

Nov. 29, 1991 [JP] Japan ................................. 3-340022
Feb. 27, 1992 [JP] Japan ................................. 4-076376
Apr. 28, 1992 [JP] Japan ................................. 4-136000

[51] Int. Cl.⁶ ............................................. G11B 23/02
[52] U.S. Cl. ................................. 242/347.1; 360/132
[58] Field of Search ............... 360/132, 94, 96.5, 134; 242/198, 199

[56] References Cited

U.S. PATENT DOCUMENTS

| | | | |
|---|---|---|---|
| 4,449,677 | 5/1984 | Ohta et al. | 360/132 |
| 4,680,660 | 7/1987 | Ueda | 360/132 |
| 5,065,955 | 11/1991 | Fujii | 360/132 |

FOREIGN PATENT DOCUMENTS

| | | | |
|---|---|---|---|
| 58-62877 | 4/1983 | Japan | 360/132 |
| 168979/84 | 9/1984 | Japan | . |
| 127391/91 | 5/1991 | Japan | . |
| 235279/91 | 10/1991 | Japan | . |
| 3381/92 | 1/1992 | Japan | . |

*Primary Examiner*—A. J. Heinz
*Assistant Examiner*—Kevin M. Watkins
*Attorney, Agent, or Firm*—Michael N. Meller

[57] ABSTRACT

The present invention discloses a tape cassette having a front lid for protecting a magnetic surface of a magnetic tape accommodated in a casing against dust or the like and a rear lid for protecting a back surface of the magnetic tape. The tape cassette includes a connecting lever rotatably supported on a support portion formed at the back of the front lid and guide portions formed in the casing for engaged with guide pins provide at the rear lid to guide the rear lid in opening/closing directions. The rear lid is suspended in a rotatable manner from one end portion of the connecting lever for protecting the back face of the magnetic tape being loaded along the front side of the casing. The rear lid is opposed to the back surface of the magnetic tape, and is associated with the opening/closing actions of said front lid while engaging with the guide portions formed in the casing.

6 Claims, 18 Drawing Sheets

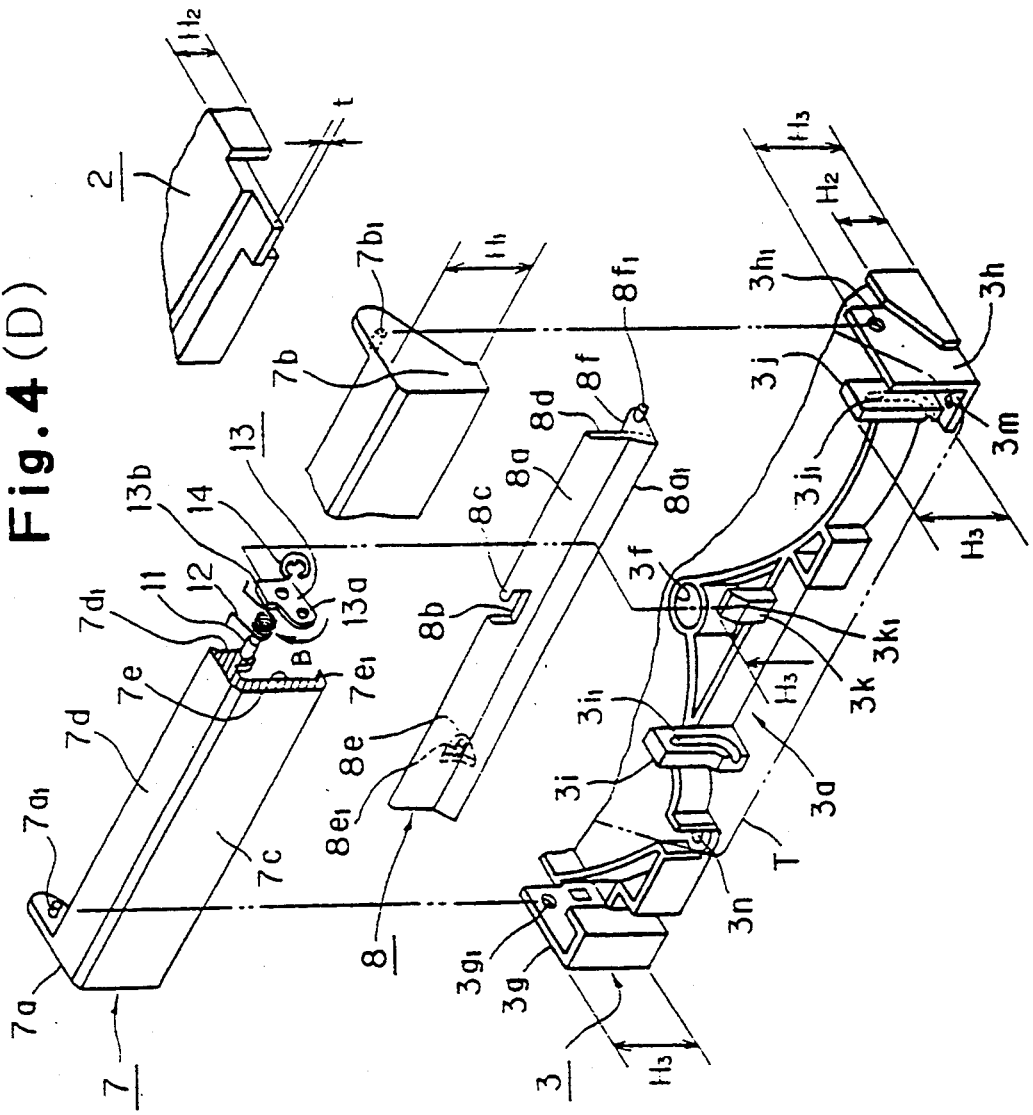

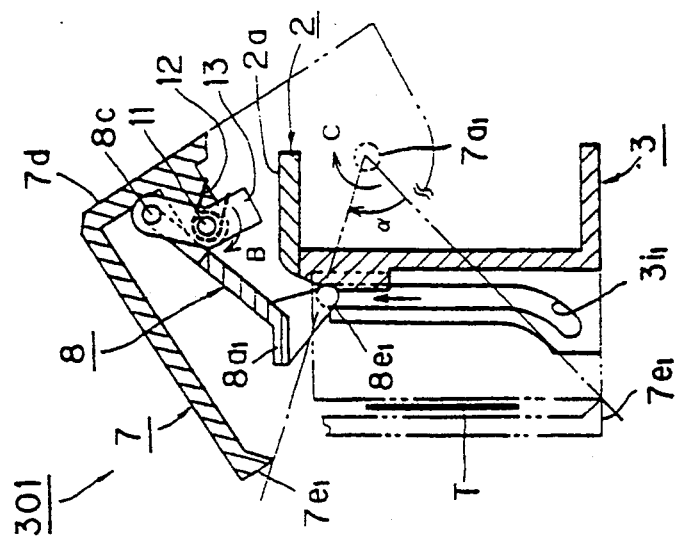
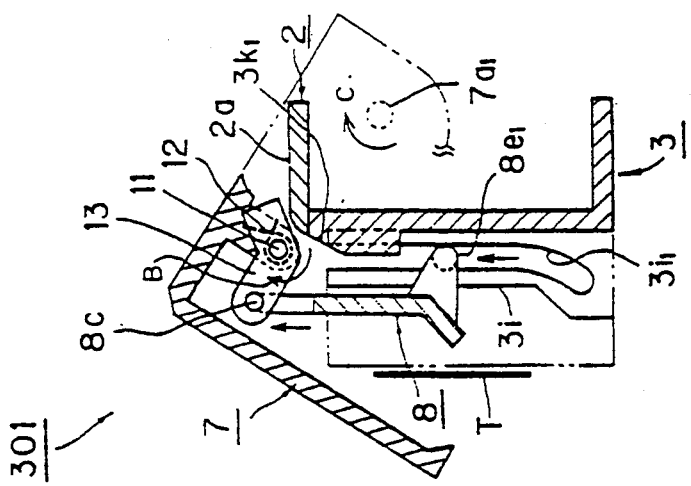
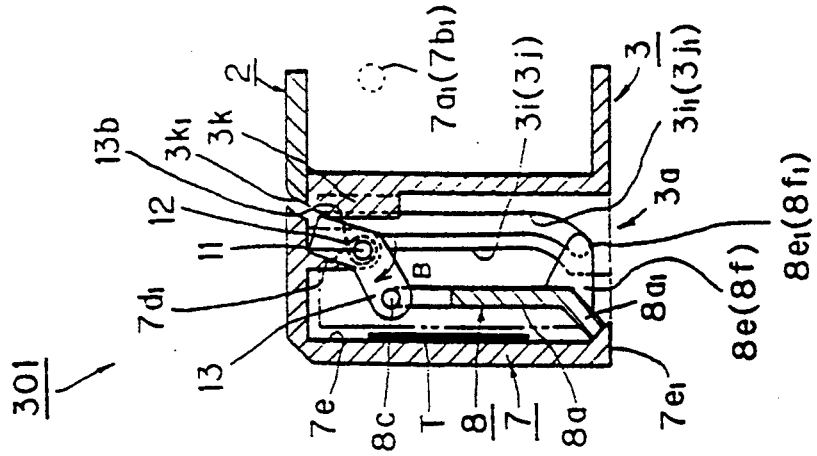

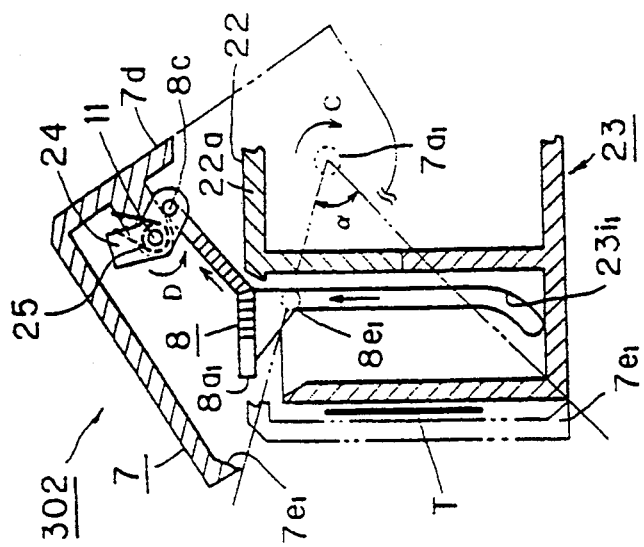
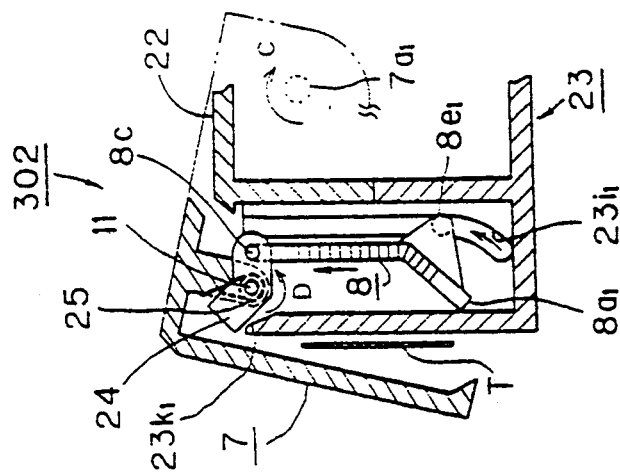
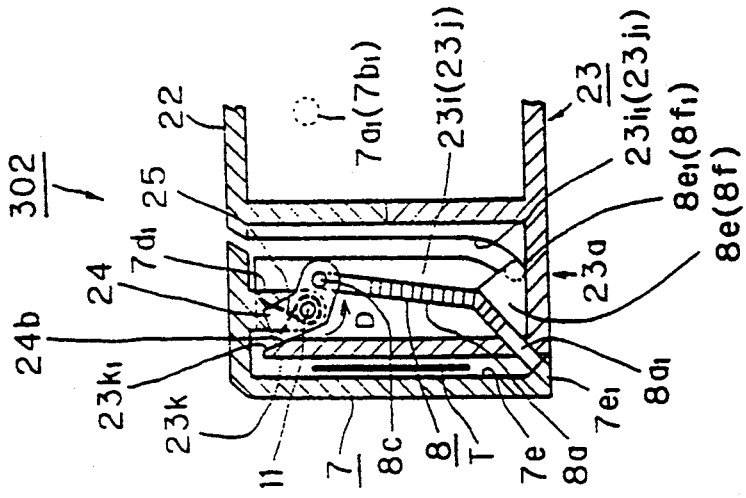

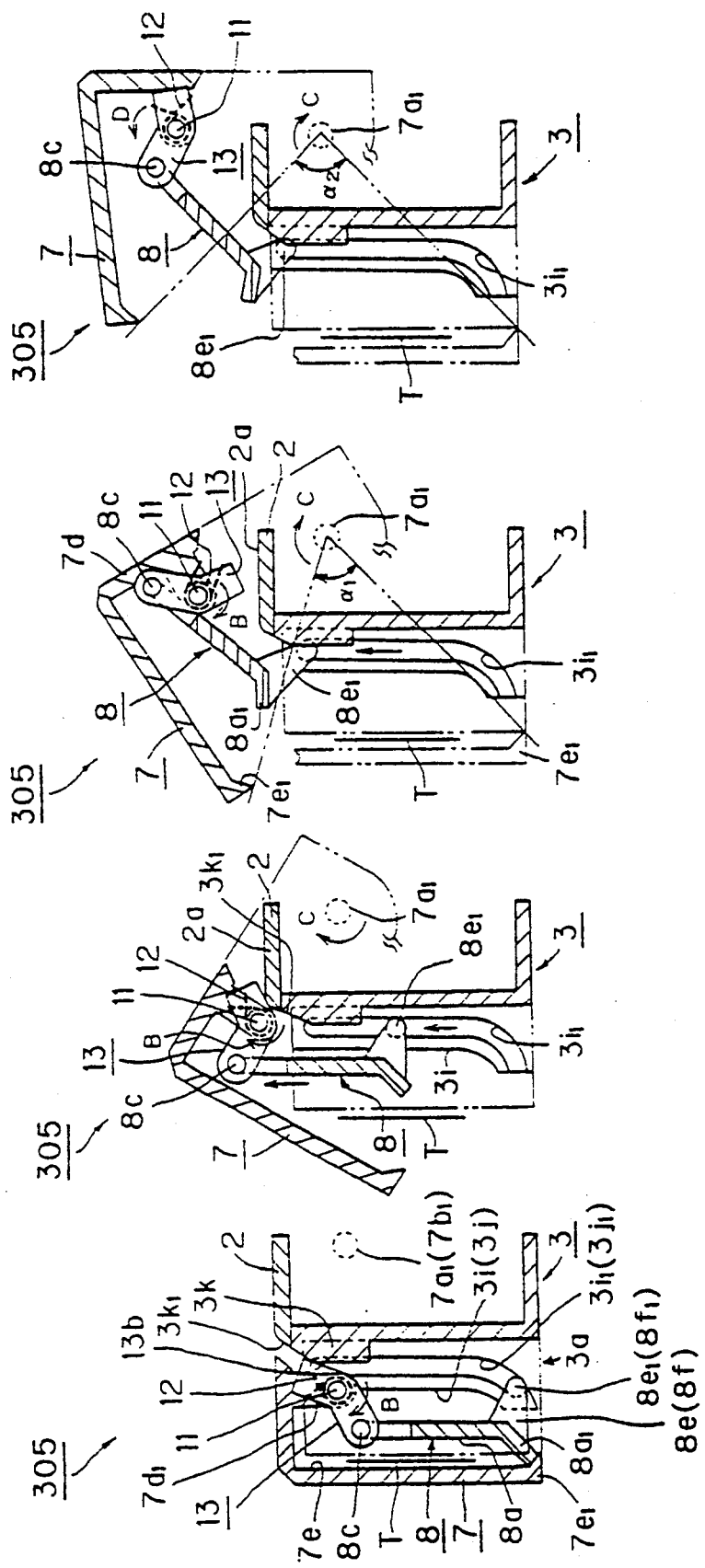

TAPE CASSETTE HAVING FRONT AND REAR RIDS FOR THE TAPE AND A ROTATABLE LEVER CONNECTING THE RIDS

BACKGROUND OF THE INVENTION

1. Field of the Invention

The present invention relates to a tape cassette for use with a magnetic recording and/or playback apparatus and, more particularly, to a tape cassette having front and rear lids for protecting a loaded magnetic tape against dust and having its rear lid suspended from the front lid by means of a connecting lever.

2. Description of the Related Art

A tape cassette to be used with a magnetic recording and/or playback apparatus such as a video tape recorder is exemplified by a VHS standard tape cassette having a tape width of ½ inch or an 8 mm tape cassette having a tape width of 8 mm, as is well known in the prior art.

A VHS tape cassette 100, as shown in FIGS. 1(A) and 1(B), is assembled from an upper half member 101 and a lower half member 102 into a box-shaped casing. This VHS standard tape cassette 100 is used to perform the recording and/or playback operations by not-shown magnetic recording and/or playback apparatus. For these operations, the VHS standard tape cassette 100 has its external size and shape generally standardized to keep interchangeability with the apparatus.

Moreover, a magnetic tape T is made to move between a supply reel 103 and a take-up reel 104, which are disposed in the VHS standard tape cassette 100. The magnetic tape T wound on the supply reel 103 is guided around a supply side guide pole 105 and along a front lid 106 disposed at openings 102a of the lower half member 102 and is taken up around a take-up side guide pole 107 on the take-up reel 104.

Still moreover, the opening 102a of the lower half member 102 is opened at its bottom for admitting (not-shown) tape loading members of the apparatus.

On the other hand, the front lid 106 is provided for protecting the magnetic face of the magnetic tape T against dust and against the human touch. This front lid 106 is so supported at the righthand and lefthand sides of the tape cassette 100 that it can be opened or closed on a pair of pins 106a and 106a (although only one is shown) integrated with the inner side of the righthand and lefthand sides. However, the front lid 106 is retained and closed by a front lid lock member 108 disposed at the lefthand side.

Only when the VHS standard tape cassette 100 is inserted into the (not-shown) magnetic recording and/or playback apparatus, as shown in FIG. 1(B), the front lid lock member 108 is released by a lid opening device of the apparatus so that the front lid 106 is opened on the pins 106a formed on the front lid 106, as indicated by double-dotted lines. At this time, an opening angle Θ₁ to be taken by the front lid 106 is not so large for a small-sized, lightweight portable apparatus but is sufficiently large for a large-sized tape deck or professional-use apparatus.

With the front lid 106 opened, the apparatus is loaded with the magnetic tape T along its predetermined tape path by the (not-shown) tape loading members inserted into the openings 102a.

On the other hand, the 8 mm tape cassette, 200, as shown in FIGS. 2(A) and 2(B) has a construction substantially similar to the aforementioned one and is assembled from upper and lower half members 201 and 202 into a box-shaped casing, which is equipped therein with a supply reel 203 and a take-up reel 204 for causing the magnetic tape T to move thereon. In an opening 202a in the lower half member 202 and at the back of a front lid 205, there is disposed a rear lid 206 for protecting the back face of the magnetic tape T opposite to the magnetic face.

This 8 mm tape cassette 200 is disclosed in the Japanese Patent Laid-Open No. 168979/1984. The following is a brief description of the area in the vicinity of the front lid 205 and the rear lid 206. Along the front lid 205 which is disposed at the side of the opening 202a of the lower half member 202, there is guided the magnetic tape T which is protected while being interposed between the front lid 205 and the rear lid 206.

Specifically, the front lid 205 is so supported at the righthand and lefthand sides of the upper and lower half members 201 and 202 that it can be freely opened or closed on a pair of pins 205a and 205a formed integrally with the inner walls of the righthand and lefthand sides thereof. From the middle portion of the front lid 205, on the other hand, there concurrently depend a pair of projections 205b and 205b, which in rotatably support the generally "T-shaped" rear lid 206 such that the rear lid 206 can rotate by means of a pair of pins 206a and 206a integral therewith.

From the lower ends of the righthand and lefthand sides of the rear lid 206, there are concurrently projected a pair of guide pins 206b and 206b. These guide pins 206b and 206b are fitted in a pair of guide grooves 202b and 202b which are formed in the righthand and lefthand sides of the opening 202a of the lower half member 202.

Only when a not-shown magnetic recording and/or playback apparatus is loaded with the 8 mm tape cassette 200, as shown in FIG. 2(B), the front lid 205 and the rear lid 206 are opened together by a lid opening device of the apparatus rotating around the supporting pins 205a formed on the front lid 205, as indicated by double-dotted lines.

Here, the rear lid 206 is opened concurrently and associatively with the opening action of the front lid 205 to a position of a large open angle Θ₂ above the upper face 201a of the upper half member 201. Meanwhile, the rear lid 206 is opened upward on its pins 206a, with the guide pins 206b guided in the guide grooves 202b formed in the lower half member 202.

In recent years, the magnetic tape T is required to undergo the recording and/or playback operations in a high density and in an excellent quality. At the present stage, moreover, in which the recording and playing operations can be digitally effected, the recording and/or playback qualities are apt to be seriously deteriorated if the magnetic tape T becomes dusty or is stained with fingerprints.

In the aforementioned VHS tape cassette 100, the magnetic tape T does not have its magnetic face and opposite back face protected. As a result, if the magnetic tape T has its back face soiled with dust coming from the openings 102a or erroneously or accidentally stained with the fingerprints through the openings 102a, its back face may come into close contact with its magnetic face to cause malfunctions when it is wound on the supply reel 103 and the take-up reel 104.

It is, therefore, considered that a member corresponding to the disclosed rear lid (206) of the aforementioned 8 mm tape cassette 200 is attached to the VHS tape cassette 100. However, the not-shown magnetic recording and/or playback apparatus adopting the VHS tape cassette 100 has already been widely used in the relevant field. Considering the interchangeability between the VHS tape cassette 100 and the apparatus, the following problems 1 and 2 will arise to trouble the users seriously, if the construction of the 8 mm tape cassette 200 is incorporated as it is. Thus, it is difficult to adopt the member corresponding to the rear lid (206) with the existing construction.

1 In the apparatus of the type such as a portable video deck or a video movie, the front lid has its open angle designed to the minimum so as to reduce the size. In case, therefore, the member corresponding to the rear lid (206) of the aforementioned construction of the 8 mm tape cassette 200, that member will come into contact with the tape loading members for extracting the magnetic tape T into the apparatus.

2 In the apparatus of the type such as a large-sized video deck or a video deck for professional use, on the other hand, the open angle of the front lid is designed to a sufficient value. In case, therefore, the member corresponding to the rear lid (206) of the construction of the aforementioned 8 mm tape cassette 200, the guide pins (206b, 206b) of the member corresponding to the rear lid (206) will come upward out of the guide grooves (202b, 202b) and be damaged when the member corresponding to the rear lid (206) is closed.

In short, the rear lid opening/closing structure associated with the front lid must be reliably applied in its basic construction not only to apparatus having a large front lid open angle but also to apparatus having a small angle, no matter how much its external shape might be different. Thus, there has been desired a tape cassette which can satisfy that condition.

SUMMARY OF THE INVENTION

Accordingly, a general object of the present invention is to provide a novel and useful tape cassette in which the above disadvantage has been eliminated.

A more specific object of the present invention is to provide a tape cassette structure having a casing including an opening for admitting tape loading members of a magnetic recording and/or playing apparatus, a supply reel disposed in the casing for holding and supplying a magnetic tape out of it, a take-up reel disposed in the casing for taking up the magnetic tape from the supply reel along the front side of the casing, a front lid disposed in openable/closable manners at the front side of the casing for protecting one surface of the magnetic tape being taken up along the front side and a rear lid disposed in the opening and at the back of the front lid for being adapted to be opened or closed together with the front lid for protecting the other surface of the magnetic tape, wherein the improvement comprises, a connecting lever supported in a rotatable manner on a support portion which is formed at the back side of the front lid, guide portions formed in the casing for engagement with guide pins provided on the rear lid to guide the rear lid in opening/closing directions and the rear lid suspended in a rotatable manner from one end portion of the connecting lever for protecting that back face of the magnetic tape being loaded along the front side of the casing, which rear lid is opposed to the other surface, and is associated with the opening/closing actions of the front lid while engaging with the guide portions formed in the casing.

BRIEF DESCRIPTION OF THE DRAWINGS

FIG. 4(D) is a partially broken, exploded perspective view showing the area in the vicinity of a front lid and a rear lid constituting an essential portion of a tape cassette according to a fifth embodiment of the present invention;

FIGS. 6(A), 6(B) and 6(C) are vertical sections taken in the direction of arrows VI—VI of FIG. 5(A) for explaining the lid opening actions of the tape cassette according the first embodiment of the present invention;

FIGS. 7(A), 7(B) and 7(C) are vertical sections for explaining the construction and lid opening actions of the tape cassette according to a second embodiment of the present invention;

FIG. 9(A) is a view showing the closed state of the front lid and the rear lid for explaining the lid closing action of the tape cassette according to the fourth embodiment of the present invention;

FIG. 9(B) is a view showing the state, in which the front lid and the rear lid are being closed, for explaining the lid closing action of the tape cassette according to the fourth embodiment of the present invention;

FIG. 9(C) is a view showing a first lid open state, in which the front lid and the rear lid have smaller open angles, for explaining the lid closing action of the tape cassette according to the fourth embodiment of the present invention;

FIG. 9(D) is a view showing a second lid open state, in which the front lid and the rear lid have larger open angles, for explaining the lid closing action of the tape cassette according to the fourth embodiment of the present invention;

FIGS. 10(A)–10(D) are sectional views taken along the line X—X of FIG. 5(D).

FIG. 10(A) is a vertical section taken in the direction of arrows X—X of FIG. 5(D) and shows the state, in which the front lid and the rear lid are closed, for explaining the lid opening action of the tape cassette according to the fifth embodiment of the present invention;

FIG. 10(B) is a vertical section taken in the direction of arrows X—X of FIG. 5(D) and shows the state, in which the front lid and the rear lid are being opened, for explaining the lid opening action of the tape cassette according to the fifth embodiment of the present invention;

FIG. 10(C) is a vertical section taken in the direction of arrows X—X of FIG. 5(D) and shows the state, in which the front lid and the rear lid having smaller open angles are opened, for explaining the lid opening action of the tape cassette according to the fifth embodiment of the present invention;

FIG. 10(D) is a vertical section taken in the direction of arrows X—X of FIG. 5(D) and shows the state, in which the front lid and the rear lid having larger open angles are opened, for explaining the lid opening action of the tape cassette according to the fifth embodiment of the present invention;

DETAILED DESCRIPTION OF THE PREFERRED EMBODIMENTS

The tape cassette according to the present invention will be described in connection with the embodiments thereof with reference to FIGS. 3 to 10. This description will be made in detail individually for the embodiments in the order of the items of <Construction of Tape Cassette> and <Lid Opening Action of Tape Cassette>.

<Construction of Tape Cassette according to First Embodiment>

Figure 1A:
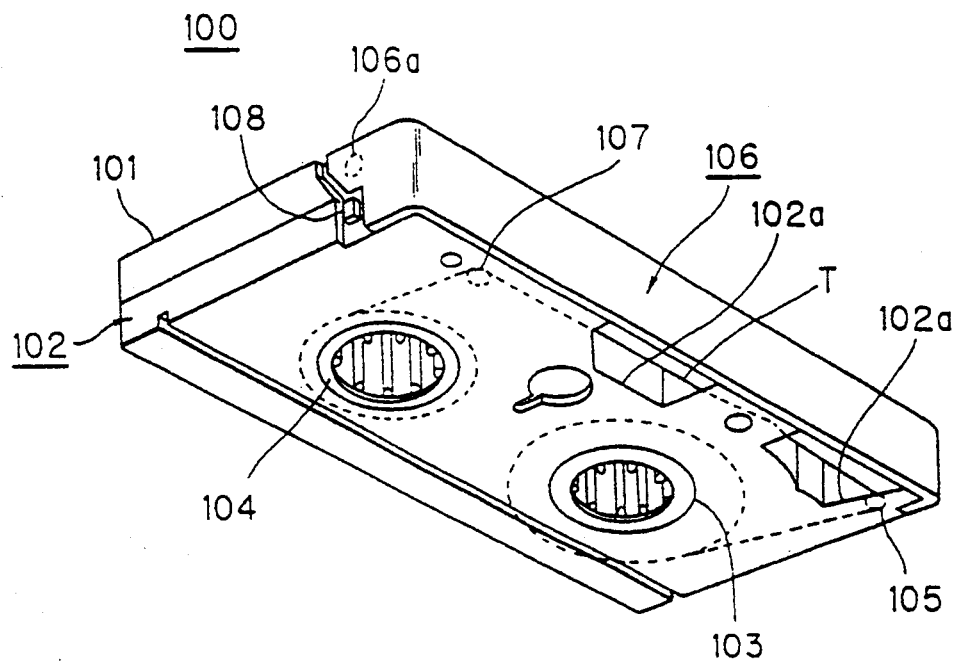
FIGS. 1(A) and 1(B) are views for explaining the construction and lid opening action of the VHS standard tape cassette of the prior art.
Figure 1B:
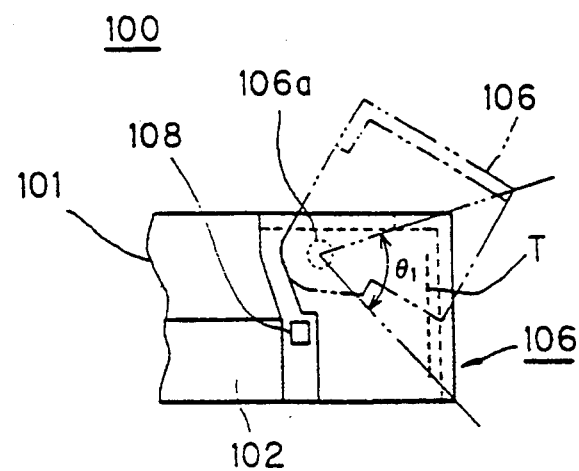
Figure 2A:
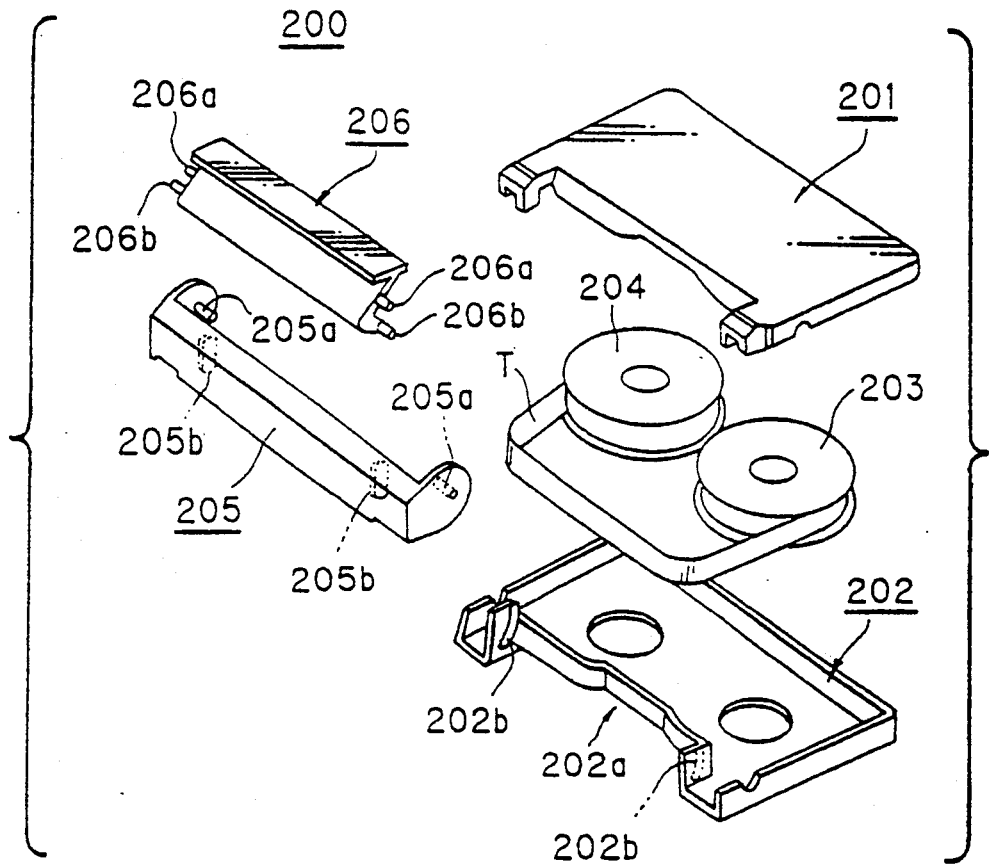
FIGS. 2(A) and 2(B) are views for explaining the construction and lid opening action of the 8 mm tape cassette of the prior art.
Figure 2B:
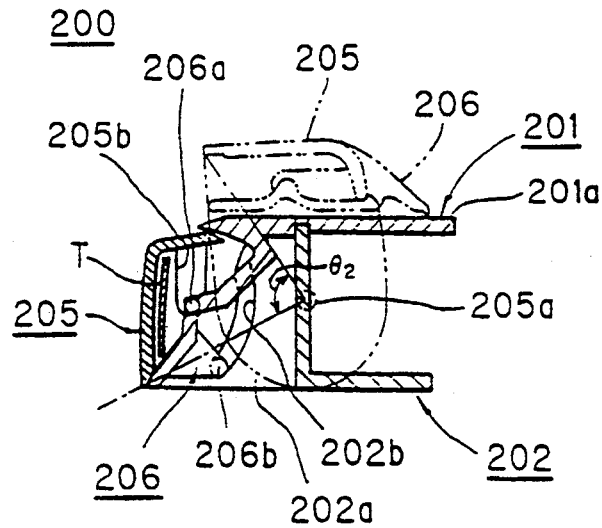
Figure 3:
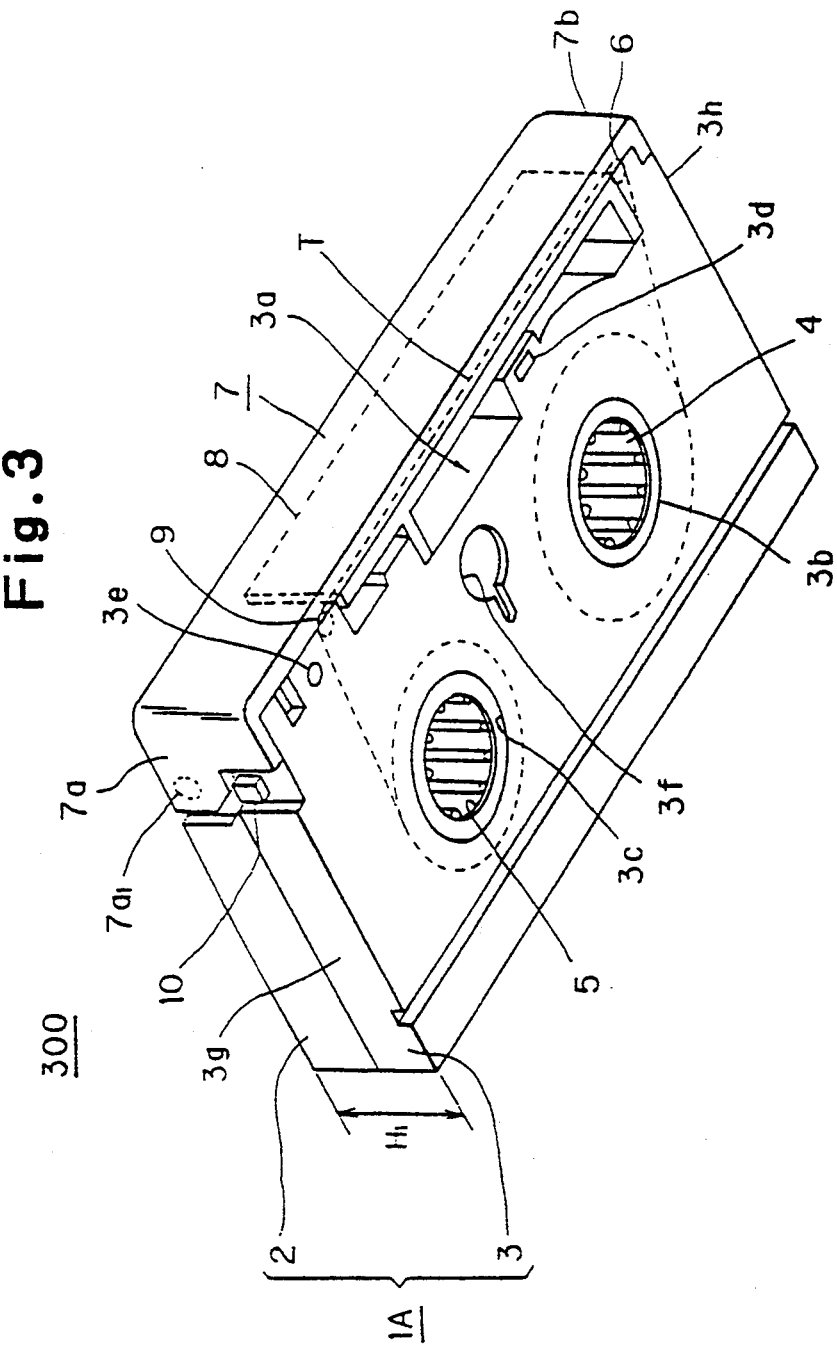
FIG. 3 is a perspective view showing the entire construction of a tape cassette according to the present invention.
Figure 4A:
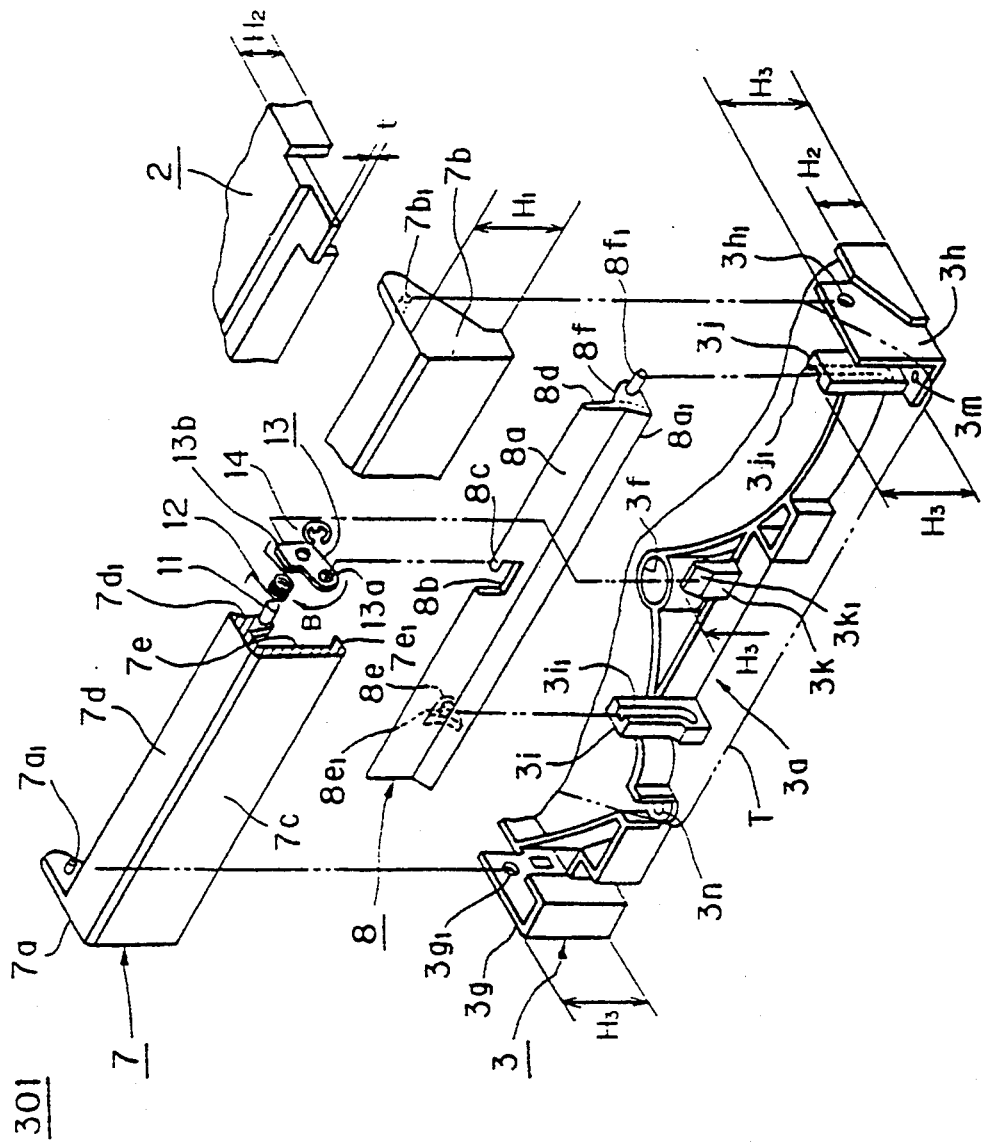
FIG. 4(A) is a partially broken, exploded perspective view showing the area in the vicinity of a front lid and a rear lid constituting an essential portion of a tape cassette according to a first embodiment of the present invention.
Figure 5A:
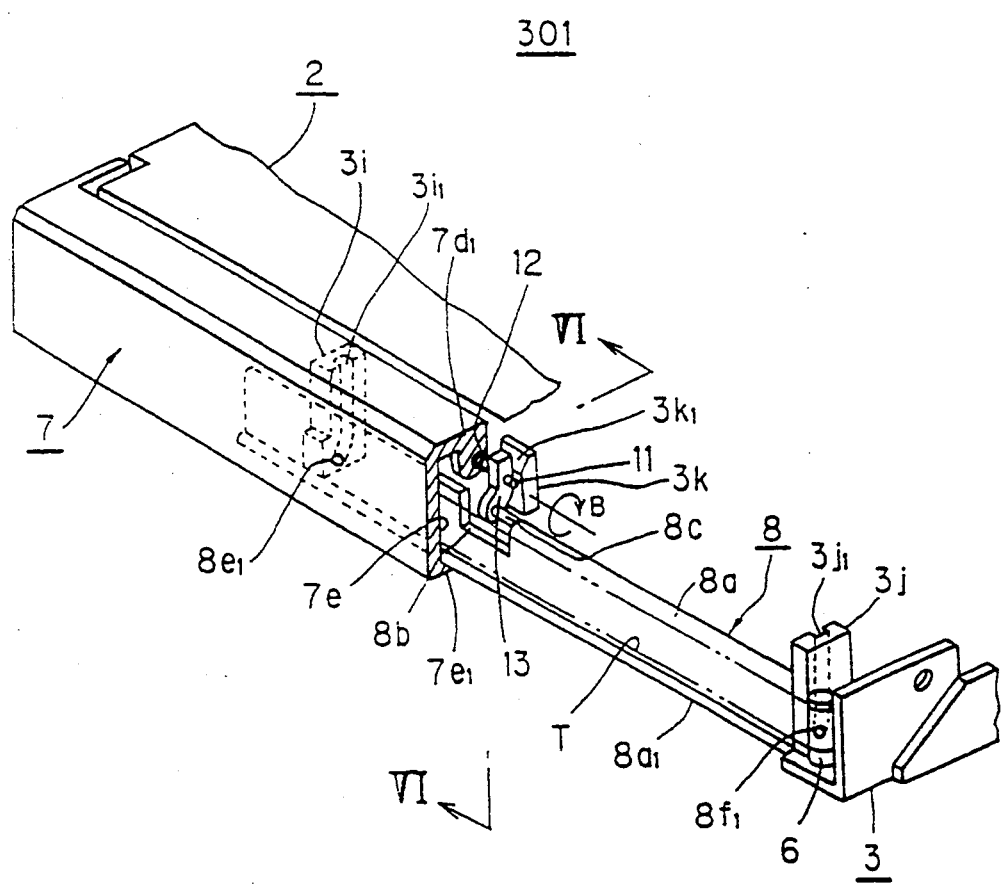
FIG. 5(A) is a partially broken perspective view showing in an assembled state the area in the vicinity of the front lid and the rear lid constituting an essential portion of the tape cassette according to the first embodiment of the present invention.

FIG. 3 is a perspective view showing the entire construction of a tape cassette according to the first embodiment of the present invention; FIG. 4(A) is a partially broken, exploded perspective view showing the area in the vicinity of a front lid and a rear lid constituting an essential portion of the tape cassette according to the first embodiment of the present invention; and FIG. 5(A) is a partially broken perspective view showing in an assembled state the vicinity of the front lid and the rear lid constituting the essential portion of the tape cassette according to the first embodiment of the present invention.

A tape cassette 300 which is common to the first to fifth embodiments of the present invention, as shown in FIG. 3, is halved into an upper half member 2 and a lower half member 3 of a resin material such that the upper half member 2 and the lower half member 3 are assembled into a box-shaped casing 1A. This casing 1A is equipped therein with a supply reel 4 and a take-up reel 5, between which is made to run a magnetic tape T. The magnetic tape T wound on the supply reel 4 is guided, after having passed around a guide pole 6 at the supply side, through a gap between a front lid 7 and a rear lid 8, which are disposed at the front side of an opening 3a opened at a bottom of the lower half member 3, and is taken up around a guide pole 9 at the take-up side by the take-up reel 5.

The opening 3a of the lower half member 3 admits a tape loading members of a (not-shown) magnetic recording and/or playback apparatus. In addition to this opening 3a, the lower half member 3 is formed on its bottom: with holes 3b and 3c, which are aligned correspondingly the supply reel 4 and the take-up reel 5; with positioning holes 3d and 3e located in the vicinity of the opening 3a for positioning the tape cassette 300 in the apparatus; and with a hole 3f for admitting a (not-shown) light emitting element for detecting the loaded state of the magnetic tape T.

Here is also referred to FIG. 4(A) showing the essential portion of the tape cassette, as designated as 301, of the first embodiment. The aforementioned front lid 7 supported in openable and closable manners on the lefthand and righthand sides 3g and 3h of the casing 1A (i.e., the lower half member 3) by means of a pair of pins $7a_1$ and $7b_1$ (although only the pin $7a_1$ is explicitly shown) which are formed integrally with the inner walls of the lefthand and righthand sides 7a and 7b of the front lid 7. Before the apparatus is loaded with the tape cassette 301, the front lid 7 is retained by a front lid lock member 10 which is disposed on the lefthand side 3g of the lower half member 3, so that it is in its closed state. Moreover, the front lid 7 protects one face (as will be called the "magnetic face") of the magnetic tape T, when it is closed, against dust and touch of human hands.

Incidentally, the opening action of the front lid 7 is allowed only when the tape cassette 301 is inserted into the (not-shown) magnetic recording and/or playback apparatus. At this time, the front lid lock member 10 is released by the lid opening device of the apparatus to allow the front lid 7 to be opened, as will be described in detail hereinafter.

On the other hand, the aforementioned rear lid 8, which is located at the back of the magnetic tape T loaded along the front lid 7, is opened or closed together with the opening/closing actions of the front lid 7. It forms the essential portion of the present invention that the rear lid 8 is opened with the minimum open angle α (as better seen from FIGS. 6(C) and 7(C)) of the front lid 7 when the front lid 7 is opened, as will be described hereinafter.

This rear lid 8 is provided for protecting against the dust the back face of the magnetic tape T, which is opposite to the magnetic face. The back face is otherwise accessible through the opening 3a provided in the lower half member 3, thus is liable to get fingerprints. The rear lid 8 further protects the magnetic tape T itself from being scratched by foreign objects which may come through the opening 3a.

Thanks to the provision of the rear lid 8, the magnetic tape T has its back face protected against the dust or fingerprints and is prevented from being scratched. As a result, even when the magnetic tape T has its back face contacting with the magnetic tape T, while it is wound on the supply reel 4 and the take-up reel 5, the magnetic recording and/or playback operations can be accomplished without any problems.

Here will be described major structural members constituting the essential portion of the present invention for supporting the front lid 7 and the rear lid 8 with reference to FIG. 4(A).

As shown in FIG. 4(A), with some exceptional portions the upper half member 2 and the lower half member 3 are individually formed and each have a height $H_2$ which is about one half of the height $H_1$ of the front lid 7 being substantially equal to that of the tape cassette 301 (or 300 in FIG. 3).

Moreover, the lefthand and righthand sides 3g and 3h of the lower half member 3 have a height $H_3$ slightly lower than the height $H_1$ of the front lid 7 and are formed with a pair of opposed holes $3g_1$ and $3h_1$. Fitted in these paired holes $3g_1$ and $3h_1$, are paired pins $7a_1$ and $7b_1$ which are so formed integrally with the inner walls of the lefthand and righthand sides of the front lid 7 that they are opposed to each other. Thus, the front lid 7 is supported in the openable and closable manners on the pins $7a_1$ and $7b_1$.

On the other hand, the lower half member 3 is in its front side formed with the opening 3a having such a space to admit the (not-shown) tape loading members. At the lefthand and righthand inner sides of the opening 3a, there are formed a pair of projections 3i and 3j which are spaced and opposed each other. These projections 3i and 3j are projected upward with the height He which is slightly lower than the height $H_1$ of the front lid 7. The projection 3i is offset slightly to the lefthand side of the center portion of the lower half member 3, whereas the projection 3j is located in the vicinity of the righthand side 3h. Moreover, the projections 3i and 3j are formed with a pair of opposing guide portions $3i_1$ and $3j_1$ (as will be called the "guide grooves") which are "boot-shaped" grooves having open tops respectively. In these paired guide grooves $3i_1$ and $3j_1$, there can be fitted (in engagement) bosses $8e_1$ and $8f_1$ which are formed in the rear lid 8, as will be described hereinafter. Incidentally, the paired projections 3i and 3j in the opening 3a are so disposed that they do not obstruct the opening action of the rear lid 8.

Moreover, at an approximate center of the lower half member 3 and inside of the opening 3a, and between the lefthand projection 3i and the righthand projection 3j, there is formed a regulate portion 3k (as will be called the "lever guide portion 3k") which is projected upward to have the height $H_3$ slightly lower than the height $H_1$ of the front lid 7. The lever guide portion 3k has its upper leading end portion tapered, as at $3k_1$. This tapered portion $3k_1$ can be abutted by an abutment portion 13b of a connecting lever 13, which is supported by the front lid 7, as will be described hereinafter, so that it regulates the rotation of the connecting lever 13 when in the lid closing action.

On the other hand, the bottom of the lower half member 3 is formed at its front side with holes 3m and 3n, in which the guide poles 6 and 9 (as shown in FIG. 3) are planted, so that the magnetic tape T is threaded to form a tape path, as indicated by double-dotted lines, by the guide poles 6 and 9. Behind of the lever guide portion 3k, on the other hand, there is formed the aforementioned hole 3f, which allows the (not-shown) light emitting element to enter. The hole 3f is located generally at the center portion of the lower half member 3.

The aforementioned lefthand and righthand sides 3g and 3f, projections 3i and 3j and lever guide portion 3k formed at the lower half member 3 are structures to be associated with the opening actions of the front lid 7 and the rear lid 8, as will be described hereinafter, so that they are formed integrally with the lower half member 3 with the height $H_3$ slightly lower than the height $H_1$ of the front lid 7 so as to keep excellent positioning accuracies of the front lid 7 and the rear lid 8. However, their formations should not be limited to the above-specified ones but they may be formed either concurrently in the identical positional relations at the upper half member 2 or separately in the identical positional relations at the upper and lower half member 2 and 3. Moreover, for assembling the upper half member 2 with the lower half member 3, the upper half member 2 has a thinner part of thickness "t", when the lefthand and righthand slides 3g and 3h, the projections 3i and 3j and the lever guide portion 3k are formed to have the height $H_3$.

Next, between the lefthand and righthand sides 7a and 7b of the front lid 7 is extended in 2 right angle directions to a front side 7c and an upper side 7d to forming an "inverted L-shape", and the front side 7c has its lower end slightly extended to form a triangular (sectional view) portions $7e_1$ at a back side 7e. The triangular portion $7e_1$ has a function to wrap the lower end of the magnetic tape T, which is loaded along the front lid 7, in a sealed state together with a later-described lower end portion $8a_1$ of the rear lid 8, when in the lid closing action. Thus, the triangular portion $7e_1$ protects the magnetic tape T in a state isolated from the opening 3a.

At the back side of the center portion of the front lid 7, on the other hand, there depends from the back of the upper side 7d a support portion $7d_1$ (as will be called the "lever support portion $7d_1$"), having a shaft 11. To this shaft 11, moreover, there is hinged the connecting lever 13 having a dog-leg shape, which is urged by a torsion spring 12 to rotate on the shaft 11 in the clockwise direction (i.e., in the direction of arrow B) of the drawing. On a distal end of the shaft 11, there is fitted a snap ring 14 for retaining the connecting lever 13 to prevent it from coming off the shaft 11.

On the other hand, the connecting lever 13 is formed at its lower end portion with a hole 13a for suspending rotatably the rear lid 8 and at its other upper end portion across the shaft 11 additionally formed with an abutment portion 13b for abutting against the tapered portion $3k_1$ of the lever guide portion 3k formed at the lower half member 3.

The aforementioned connecting lever 13 is a member constituting the essential portion of the present invention. The connecting lever 13 enables the rear lid 8 to rotate with respect to the front lid 7. Thanks to the provision of the connecting lever 13, the degree of freedom of the opening (or closing) action of the rear lid 8 is increased, as will be described hereinafter, so that the rear lid 8 can be opened to a required angle without opening the front lid 7 widely.

Next, the front side $8a$ of the rear lid 8 facing the front lid 7 is formed into a dog-leg shape, i.e. a bottom portion of the rear lid 8 is protruding or bent toward front forming a lower end portion $8a_1$, and the rear lid 8 is suspended in parallel with the front lid 7 by means of the connecting lever 13 at the back of the front lid 7 and the magnetic tape T. When in the closing actions of the front lid 7 and the rear lid 8, the lower end portion $8a_1$ of the front side $8a$ comes into abutment against the triangular portion $7e_1$ formed at the front lid 7, to protect the lower end of the magnetic tape T.

Specifically, the rear lid 8 has, at its central upper portion, an L-shape recess $8b$ defining a pin $8c$ projecting leftward. The hole $13a$ of the aforementioned connecting lever 13 is engaged with the pin $8c$ in the L-shape recess $8b$, so that the rear lid 8 is connected in a suspended state to the front lid 7 by means of the connecting lever 13 and is allowed to rotate on the pin $8c$.

Moreover, the rear lid 8 is integrally formed, at its back side $8d$ and below its middle portion, with a backward projection $8e$ and, at its back side $8d$ and in the vicinity of the righthand side, with a projection $8f$ having a shape identical to that of the projection $8e$. These projections $8e$ and $8f$ are opposed to each other and formed with bosses $8e_1$ and $8f_1$ projected outward.

Moreover, when the rear lid 8 is assembled to be suspended from the front lid 7 with the connecting lever 13, the bosses $8e_1$ and $8f_1$ formed at the rear lid 8 are inserted downward to (or fitted in) the paired guide grooves $3i_1$ and $3j_1$ formed in the projections $3i$ and $3j$ of the lower half member 3, so that the rear lid 8 is supported at the back side of the magnetic tape T loaded along the front lid 7 and in the opening $3a$ of the lower half member 3.

In this state, as shown in FIG. 5(A), the rear lid 8 is assembled with and supported by the front lid 7, and these front and rear lids 7 and 8 are closed. As a result, the connecting lever 13 connecting the rear lid 8 to the front lid 7 has its abutment portion $13b$ abutting against the tapered portion $3k_1$ formed at the lever guide portion $3k$ of the lower half member 3 so that the rear lid 8 is suspended in a form of "dog-leg" shape toward the lower opening $3a$ by means of the connecting lever 13 where the connecting lever 13 being restricted from rotating. Moreover, the bosses $8e_1$ and $8f_1$ formed on the rear lid 8 are located in their lower positions being fitted in the paired guide grooves $3i_1$ and $3j_1$.

<Lid Opening Action of Tape Cassette of First Embodiment>

Here will be described the lid opening action of the tape cassette 301 thus constructed according to the first embodiment of the present invention with reference to FIGS. 6(A) to 6(C).

FIGS. 6(A), 6(B) and 6(C) are vertical sections taken in the direction of arrows VI—VI of FIG. 5(A) for explaining the lid opening actions of the tape cassette according the first embodiment of the present invention. FIG. 6(A) shows the state in which the front lid and the rear lid are closed; FIG. 6(B) shows the state in which the front lid and the rear lid are at interim positions; and FIG. 6(C) shows the state in which the front lid and the rear lid are fully opened. Incidentally, the parenthesized reference characters appearing in FIG. 6(A) show the opposite portions, but their description will be omitted.

In the state shown in FIG. 6(A), the front lid 7 and the rear lid 8 of the tape cassette 301 of the first embodiment are closed, and the magnetic tape T is loaded along the back side $7e$ of the front lid 7. In the opening $3a$ of the lower half member 3, on the other hand, the connecting lever 13 is rotatably hinged to the shaft 11 which is fixed on the lever support portion $7d_1$ of the front lid 7, and the rear lid 8 is rotatably connected to the one end portion of the connecting lever 13 by means of its integrated pin $8c$.

At this time, the connecting lever 13 is biased clockwise (i.e., in the direction of arrow B) around the shaft 11 by the torsion spring 12 but has its abutment portion $13b$ abutting against the tapered portion $3k_1$ of the lever guide portion $3k$. As a result, the connecting lever 13 is restricted from its rotation so that the rear lid 8 is suspended by the connecting lever 13 in the vicinity of the back face of the magnetic tape T.

Moreover, the boss $8e_1$ formed on the rear lid 8 is positioned in the lower position while being fitted in the guide groove $3i_1$ formed in the projection $3i$ of the aforementioned lower half member 3.

Moreover, the lower end portion $8a_1$ of the rear lid 8 is in close abutment against the triangular portion $7e_1$ formed at the front lid 7 so that the magnetic tape T is protected against the dust or fingerprints from the opening $3a$. Specifically, the magnetic tape T has its magnetic face covered with the front lid 7, its back face covered with the rear lid 8 and its lower end wrapped by the lower end portion $8a_1$ of the rear lid 8 and the triangular portion $7e_1$ formed at the front lid 7.

As a result, the magnetic tape T is completely protected between the front lid 7 and the rear lid 8 when the front lid 7 and the rear lid 8 are closed, namely before the tape cassette 301 is loaded to the (not-shown) magnetic recording and/or playback apparatus.

Next, when the tape cassette 301 is inserted into the (not-shown) magnetic recording and/or playback apparatus, as shown in FIG. 6(B), the front lid 7 is opened clockwise (i.e., in the direction of arrow C) on the pin $7a_1$.

Here, as the front lid 7 is opened, the abutment portion $13b$ of the connecting lever 13 hinged to the front lid 7 at the shaft 11 is released from its abutment against the tapered portion $3k_1$ formed at the lever guide portion $3k$ so that the connecting lever 13 comes into abutment against the upper side $2a$ of the upper half member 2 while being rotated clockwise (i.e., in the direction of arrow B) on the shaft 11, by the biasing force of the torsion spring 12. As a result, the rear lid 8 connected to the one end portion of the connecting lever 13 with the pin $8c$ is raised while rotating around the pin $8c$, and the boss $8e_1$ formed on the rear lid 8 slides upward in the guide groove $3i_1$.

As a result, in association with the opening action of the front lid 7, the rear lid 8 suspended by the front lid 7 by means of the connecting lever 13 is also opened. However, since the connecting lever 13 is made rotatable clockwise (i.e., in the direction of arrow B) on the shaft 11 with respect to the front lid 7 and since the rear lid 8 is made rotatable on the pin $8c$ with respect to the connecting lever 13, the rear lid 8 can be opened freely, when in the opening action, by the two fulcrums (11, 8c) of rotation so that it can achieve two phases of freedom in the link mechanism.

On the other hand, since the triangular portion $7e_1$ of the front lid 7 is moved apart, when the front lid 7 and the rear lid 8 are opened, from the magnetic face of the magnetic tape T, whereas the lower end portion $8a_1$ of the rear lid 8 is kept away from contact with the back face of the magnetic tape T because the boss $8e_1$ is guided by the guided groove $3i_1$.

Next, when the front lid 7 is further opened clockwise (i.e., in the direction of arrow C) on the pin $7a_1$, the front lid 7 and the rear lid 8 are completely opened, as shown in FIG. 6(C). In this state, the connecting lever 13 reaches above the upper side 2a of the upper half member 2 while being rotated further clockwise (i.e., in the direction of arrow B) on the shaft 11 by the biasing force of the torsion spring 12 so that the rear lid 8 connected to the one end portion of the connecting lever 13 by the pin 8c is further raised around while being rotated around the pin 8c and so that the boss $8e_1$ formed on the rear lid 8 reaches the upper portion in the guide groove $3i_1$.

At this time, as in the foregoing description, the front lid 7 and the rear lid 8 are opened without contacting the magnetic tape T, and the rear lid 8 suspended by the front lid 7 by the connecting lever 13 is given degrees of freedom with the connecting lever 13 by the two fulcrums of rotation (11, 8c). As a result, the pin 8c connected to the one end portion of the connecting lever 13 is freely lifted to the vicinity of the inner surface of the upper side 7d of the front lid 7, and the open angle "$\alpha$" of the front lid 7 can be set to a small value, e.g., about 60 to 65 degrees, as shown.

Incidentally, the closing actions of the front lid 7 and the rear lid 8 can be reversed from the aforementioned ones, and their detail will be omitted.

As a result, in the tape cassette 301 according to the first embodiment, before the tape cassette 301 is inserted into the (not-shown) magnetic recording and/or playback apparatus, the magnetic tape T can be protected between the front lid 7 and the rear lid 8 against invasion of dust and fingerprints and further against foreign objects.

In summary, when the tape cassette 301 is inserted into the magnetic recording and/or playback apparatus, an improved degree of freedom is obtained in the opening (or closing) action of the rear lid 8 to be opened (or closed) together with the front lid 7 than in case the rear lid 8 is directly suspended by the front lid 7, because the rear lid 8 is suspended by the front lid 7 with the connecting lever 13. As a result, the rear lid 8 can be opened with the front lid 7 maintaining the open angle "$\alpha$" at a small value. Thus, the tape cassette 301 having such small open angle $\alpha$ of the front lid 7 can be applied to the magnetic recording and/or playback apparatus while maintaining the interchangeability with the tape cassette of the prior art so that the tape cassette 301 having an improved quality can be offered to the user with no problems.

Moreover, in case that when the tape cassette 301 having the small open angle $\alpha$ of the front lid 7 is applied to a newly developed magnetic recording and/or playback apparatus (although not shown), such apparatus can be designed to have a shorter height, thus contributing to downsizing the apparatus.

Incidentally, the aforementioned tape cassette 301 of the first embodiment is equipped with only one connecting lever 13 for connecting the rear lid 8 to the front lid 7 and only one lever guide portion 3k for restricting a movement of the connecting lever 13. However, the connecting lever 13 and the lever guide portion 3k should not be limited thereto, but two sets may be provided in the vicinity of the righthand and lefthand two ends of the rear lid 8. In addition, the paired guide grooves $3i_1$ and $3j_1$ for fitting therein the bosses $8e_1$ and $8f_1$ formed on the rear lid 8 may also be located in the vicinity of the righthand and lefthand ends of the rear lid 8.

Moreover, in the tape cassette 301 of the first embodiment, a bias device for biasing the rear lid 8 suspended by the connecting lever 13 in the opening direction is exemplified by biasing the connecting lever 13 clockwise (i.e., in the direction of arrow B) by the torsion spring 12 to bias the rear lid 8 in the opening direction. However, this elements should not be limited to the ones as shown, but can be exemplified by equipping the rear lid 8 directly with a biasing element which corresponds to the torsion spring 12.

<Construction and Lid Opening Action of Tape Cassette according to Second Embodiment>

Here will be described the construction and lid opening actions of a tape cassette according to a second embodiment of the present invention with reference to FIGS. 7(A) to 7(C).

FIGS. 7(A) to 7(C) are longitudinal sections for explaining the construction and lid opening actions of the tape cassette according to the second embodiment of the present invention. FIG. 7(A) shows the state in which the front lid and the rear lid are closed; FIG. 7(B) shows the state in which the front lid and the rear lid are being opened; and FIG. 7(C) shows the state in which the front lid and the rear lid are opened. Incidentally, the parenthesized reference characters appearing in FIG. 7(A) designate the opposed portions.

The tape cassette 302 according to the second embodiment of the present invention has a construction similar to that of the aforementioned tape cassette 301 of the first embodiment excepting a portion. Here, for conveniences of description, the same components as those described are designated at the common reference characters, and their detailed description is omitted. The aforementioned components are suitably described, if necessary, and the components different from those of the aforementioned first embodiment are designated at new reference characters and described. Incidentally, the auxiliary characters attached to the components newly designated are identical to those attached to the foregoing components.

FIG. 7(A) shows the state in which the front lid 7 and the rear lid 8 of the tape cassette 302 of the second embodiment are closed. This second embodiment is different from the first embodiment in that the support position of a connecting lever 24 for connecting the rear lid 8 and the front lid 7 is symmetric to that of the connecting lever 13 in the tape cassette 301 of the first embodiment. In short, the difference resides in that the aforementioned connecting lever 13 is opposed in the "dog leg" shape to the front lid 7 whereas the connecting lever 24 is opposed in a "hook" shape to the front lid 7.

Moreover, the connecting lever 24 hinged in a rotatable manner to the shaft 11 fixed on the lever support portion $7d_1$ of the front lid 7 is biased counter-clockwise (i.e., in the direction of arrow D), as seen from the Drawing, on the shaft 11 by the action of a torsion spring 25.

Moreover, a regulate portion 23k (as will be called the "lever guide portion 23k") formed at a lower half member 23, against which abuts the abutment portion 24b of the connecting lever 24, is disposed in the front position of the aforementioned lever guide portion 3k and in the vicinity of the back face of the magnetic tape T, and the abutment portion 24b of the connecting lever 24 is biased by the torsion spring 25, when in the lid closing action, to abut against the taper portion $23k_1$ which is formed at the upper leading end portion of the lever guide portion 23k, thereby to regulate the rotating motion of the connecting lever 24. At this time, the lever guide portion 23k can also act as a guide of the path of the magnetic tape T because it is disposed in the vicinity of the back face of the magnetic tape T. Incidentally, since the lower half member 23 is formed with the lever guide portion 23k, as described above, the lower half member 23 has its shape partially different from the aforementioned lower half member 3. Thus, it is apparent that an upper half member 22 has a partially different shape from that of the aforementioned upper half member 2.

Moreover, the rear lid 8 connected to the one end portion of the connecting lever 24 by means of the pin 8c is suspended in the "dog leg" shape toward the opening 23a which is opened in the underlying lower half member 23, and the rear lid 8 has its lower end portion $8a_1$ partially cut away in the position of the lever guide portion 28k but partially held in close abutment against the triangular portion $7e_1$ of the front lid 7.

Next, when the tape cassette 302 is inserted into the (not-shown) magnetic recording and/or playback apparatus, as shown in FIG. 7(B), the front lid 7 is opened clockwise (i.e., in the direction of arrow C), as shown in the Drawing, on the pin $7a_1$.

Here, what is different from the tape cassette 301 of the aforementioned first embodiment is that the connecting lever 24 of the tape cassette 302 of the second embodiment is rotated counter-clockwise (i.e., in the direction of arrow D), as opposite to the aforementioned one, on the shaft 11 by the biasing force of the torsion spring 25. The subsequent actions are generally similar to the aforementioned ones. By the rotation of the connecting lever 24, the rear lid 8 connected to the one end portion of the connecting lever 24 by means of the pin 8c is lifted while rotating on the pin 8c, and the boss $8e_1$ formed on the rear lid 8 slides upward in the guide groove $23i_1$. Then, the state, as shown in FIG. 7(C), is taken when the front lid 7 and the rear lid 8 are completely opened.

In the open state of the front lid 7 and the rear lid 8, as shown in FIG. 7(C), the rear lid 8 suspended by the front lid 7 by means of the connecting lever 24 is given like before the degrees of freedom by the two fulcrums of rotation (11, 8c). As a result, the pin 8c connected to the one end portion of the connecting lever 24 is lifted without any trouble to the vicinity of the back side of the upper side 7d of the front lid 7 so that the open angle α of the front lid 7 can be set to a small value such as about 60 to 65 degrees.

As a result, the tape cassette 302 of the second embodiment can achieve effects similar to those of the tape cassette 301 of the first embodiment. Moreover, since the lever guide portion 23k formed at the lower half member 23 is disposed in the vicinity of the back face of the magnetic tape T, it can also act as a guide for the path of the magnetic tape T.

<Construction and Lid Opening Actions of Tape Cassette according to Third Embodiment>

First of all, the main component for supporting the front lid 7 and the rear lid 8 constituting the essential portion of the tape cassette 303 according to the third embodiment of the present invention will be described in detail with reference to FIGS. 4(B) and 5(B).

Figure 4B:
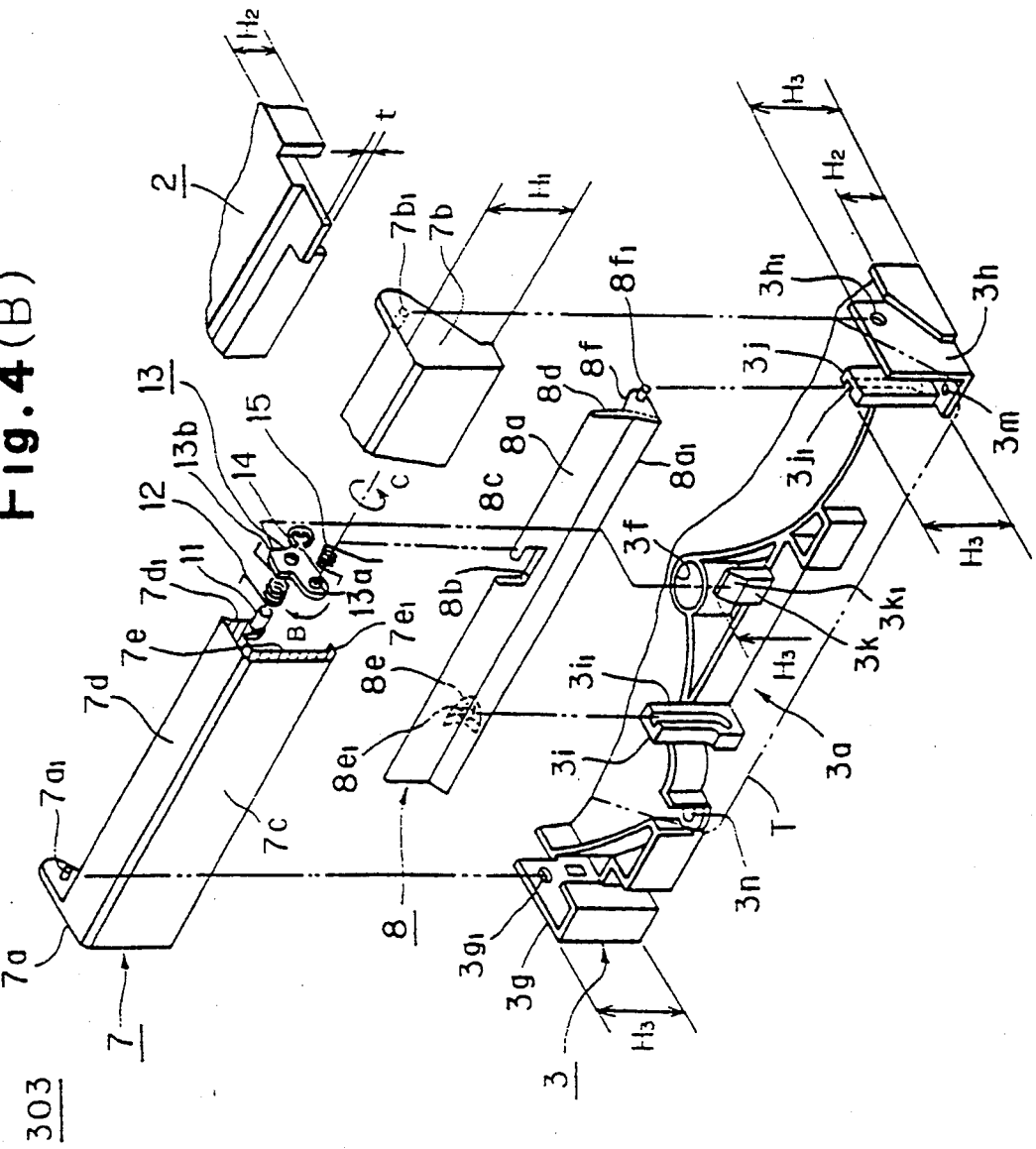
FIG. 4(B) is a partially broken, exploded perspective view showing the area in the vicinity of a front lid and a rear lid constituting an essential portion of a tape cassette according to a third embodiment of the present invention.
Figure 5B:
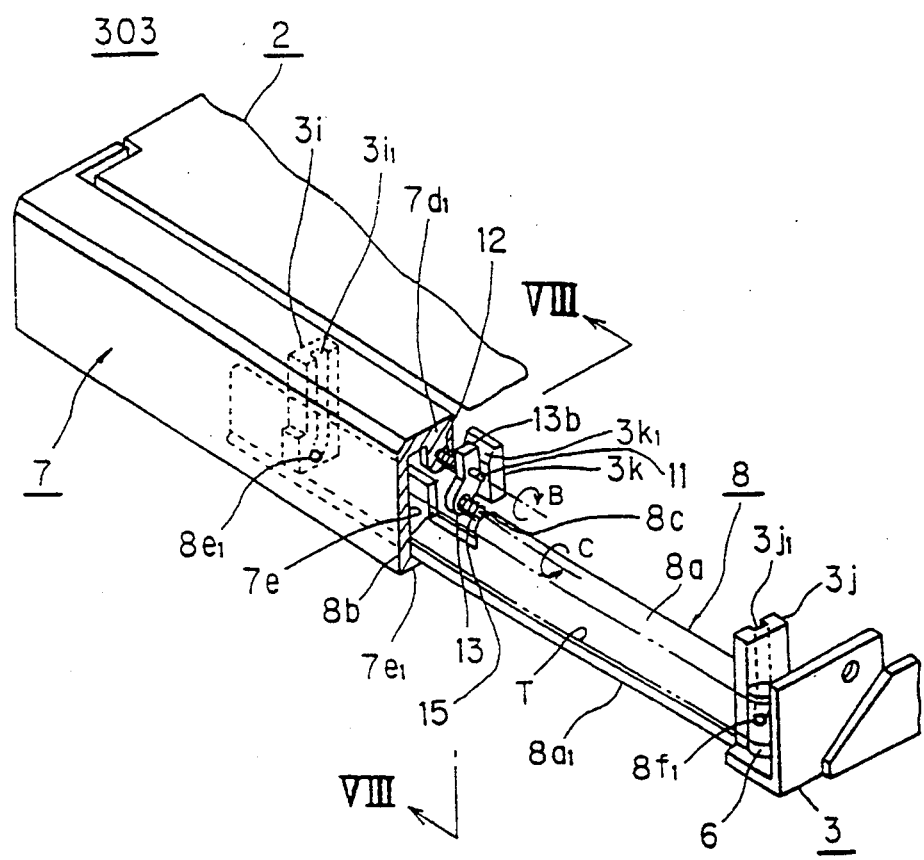
FIG. 5(B) is a partially broken perspective view showing in an assembled state the area in the vicinity of the front lid and the rear lid constituting an essential portion of the tape cassette according to the third embodiment of the present invention.

FIG. 4(B) is a partially broken, exploded perspective view showing the vicinity of the front lid and the rear lid constituting the essential portion of the tape cassette according to the third embodiment of the present invention, and FIG. 5(B) is a partially broken perspective view showing in the assembled state the vicinity of the front lid and the rear lid constituting the essential portion of the tape cassette according to the third embodiment of the present invention.

As shown in FIG. 4(B), with some exceptional portions the upper half member 2 and the lower half member 3 are individually formed and are separated at a height $H_2$ which is about one half of the height $H_1$ of the front lid 7 being substantially equal to that of the tape cassette 303 (or 300 in FIG. 3).

Moreover, the lefthand and righthand sides 3g and 3h of the lower half member 3 have a height $H_3$ slightly lower than the height $H_1$ of the front lid 7 and are formed with a pair of opposed holes $3g_1$ and $3h_1$. Fitted in these paired holes $3g_1$ and $3h_1$, are paired pins $7a_1$ and $7b_1$ which are so formed integrally with the inner walls of the lefthand and righthand sides of the front lid 7 that they are opposed to each other. Thus, the front lid 7 is supported in the openable and closable manners on the pins $7a_1$ and $7b_1$.

On the other hand, the lower half member 3 is formed in its front side with the opening 3a having such a space to admit the (not-shown) tape loading members. At the lefthand and righthand inner sides of the opening 3a, there are formed a pair of projections 3i and 3j which are spaced and opposed at a spacing each other. These projections 3i and 3j are projected upward with the height $H_3$ which is slightly lower than the height $H_1$ of the front lid 7. The projection 3i is offset slightly to the lefthand side of the center portion of the lower half member 3, whereas the projection 3j is located in the vicinity of the righthand side 3h.

Moreover, the projections 3i and 3j are formed with a pair of opposed guide portions $3i_1$ and $3j_1$ (as will be called the "guide grooves") which are "boot-shaped" grooves having open tops respectively. In these paired guide grooves $3i_1$ and $3j_1$, there can be fitted (in engagement) bosses $8e_1$ and $8f_1$ (or engagement portions) which are formed in the rear lid 8, as will be described hereinafter. Incidentally, the paired projections 3i and 3j in the opening 3a are so disposed that they do not obstruct the opening action of the rear lid 8.

Moreover, on approximate center of the lower half member 3 and inside of the opening 3a, and between the lefthand projection 3i and the righthand projection 3j, there is formed a regulate portion 3k (as will be called the "lever guide portion 3k") which is projected upward to have the height $H_3$ slightly lower than the height $H_1$ of the front lid 7. The lever guide portion 3k has its upper leading end portion tapered, as at $3k_1$. This tapered portion $3k_1$ can be abutted by an abutment portion 13b of a connecting lever 13, which is supported by the front lid 7, as will be described hereinafter, so that it regulates the rotation of the connecting lever 13 when in the lid closing action.

On the other hand, the bottom of the lower half member 3 is formed at its front side with holes $3m$ and $3n$, in which the guide poles 6 and 9 (as shown in FIG. 3) are planted, so that the magnetic tape T is to form tape path, as indicated by double-dotted lines, by the guide poles 6 and 9. Behind of the lever guide portion $3k$, on the other hand, there is formed the aforementioned hole $3f$, which allows the (not-shown) light emitting element to enter. The hole $3f$ is located generally at the center portion of the lower half member 3.

The aforementioned lefthand and righthand sides $3g$ and $3f$, projections $3i$ and $3j$ and lever guide portion $3k$ formed at the lower half member 3 are structures to be associated with the opening actions of the front lid 7 and the rear lid 8, as will be described hereinafter, so that they are formed integrally with the lower half member 3 with the height $H_3$ slightly lower than the height $H_1$ of the front lid 7 so as to keep excellent positioning accuracies of the front lid 7 and the rear lid 8. However, their formations should not be limited to the above specified ones but they may be formed either integrally in the identical positional relations at the upper half member 2 or separately in the identical positional relations at the upper and lower half member 2 and 3. Moreover, for assembling the upper half member 2 with the lower half member 3, the upper half member 2 has a thinner part of thickness when the lefthand and righthand sides $3g$ and $3h$, the projections $3i$ and $3j$ and the lever guide portion $3k$ are formed to have the height $H_3$.

Next, between the lefthand and righthand sides $7a$ and $7b$, the front lid 7 are extended in 2 right direction angle to a front side $7c$ and an upper side $7d$ forming an "inverted L-shape", and the front side $7c$ has its lower end slightly extended to form a triangular (sectional view) portion $7e_1$ at a back side $7e$. The triangular portion $7e_1$ has a function to wrap the lower end of the magnetic tape T, which is loaded along the front lid 7, in a sealed state together with a later-described lower end portion $8a_1$ of the rear lid 8, when in the lid closing action. Thus, the triangular portion $7ei$ protects the magnetic tape T in a state isolated from the opening $3a$.

At the back side of the center portion of the front lid 7, on the other hand, there depends from the back of the upper side $7d$ a support portion $7d_1$ (as will be called the "lever support portion $7d_1$"), having a shaft 11.

On this shaft 11, moreover, there are mounted the torsion spring 12 and the connecting lever 13 having a "dog leg" shape. Moreover, the torsion spring 12 has its one end portion retained on the lever support portion $7d_1$ of the front lid 7 and its other end portion retained on the connecting lever 13 and biases the connecting lever 13 to rotate it clockwise (i.e., in the direction of arrow B) of the Drawing on the shaft 11.

On a distal end of the shaft 11, there is fitted a snap ring 14 for retaining the connecting lever 13 to prevent it from coming off the shaft 11.

On the other hand, the connecting lever 13 is formed at its lower end portion with a hole $13a$ for suspending rotably the rear lid 8 and at its other upper end portion across the shaft 11, and additionally formed with an abutment portion $13b$ for abutting against the tapered portion $3k_1$ of the lever guide portion $3k$ formed at the lower half member 3.

The aforementioned connecting lever 13 is a member constituting the essential portion of the present invention. The connecting lever 13 enables the rear lid 8 to rotate with respect to the front lid 7. Thanks to the provision of the connecting lever 13, the degree of freedom of the opening (or closing) action of the rear lid 8 is increased, as will be described hereinafter.

Next, the front side $8a$ of the rear lid 8 facing the front lid 7 is formed into the "dog leg" shape, and the rear lid 8 is suspended in parallel with the front lid 7 by means of the connecting lever 13, at the back of the front lid 7 and the magnetic tape T. When in the closing action, the lower end portion $8a_1$ of the front side $8a$ comes into abutment against the triangular portion $7e_1$ formed at the front lid 7, to protect the lower end of the magnetic tape T.

Specifically, the rear lid 8 has, at its central upper portion, the L-shaped recess $8b$ defining a pin $8c$ projecting leftward. The torsion spring 15 is retained on the pin $8c$, and the hole $13a$ formed in the connecting lever 13 is fitted on the pin $8c$ so that the rear lid 8 is connected by means of the connecting lever 13 while being suspended by the front lid 7. At this time, the torsion spring 15 has its one end portion retained on the connecting lever 13 and its other end portion retained on the front wall of the recess $8b$ of the rear lid 8 and has such a biasing force as to rotate the rear lid 8 counterclockwise (i.e., in the direction of arrow C) of the Drawing on the pin $8c$.

Moreover, the rear lid 8 is integrally formed, at its back side $8d$ and below its middle portion, with a backward projection $8e$ and, at its back side $8d$ and in the vicinity of the righthand side, with a projection $8f$ having a shape identical to that of the projection $8e$. These projections $8e$ and $8f$ (as will be called the "bosses $8e_1$ and $8f_1$" in the following) are opposed to each other and formed with bosses $8e_1$ and $8f_1$ projected outward.

Moreover, when the rear lid 8 is assembled to be suspended from the front lid 7 with the connecting lever 13, the bosses $8e_1$ and $8f_1$ formed at the rear lid 8 are inserted downward to (or fitted in) the paired guide grooves $3i_1$ and $3j_1$ formed in the projections $3i$ and $3j$ of the lower half member 3, so that the rear lid 8 is supported at the back side of the magnetic tape T loaded along the front lid 7 and in the opening $3a$ of the lower half member 3.

In this state, as shown in FIG. 5(B), the rear lid 8 is assembled with and supported by the front lid 7 by means of the connecting lever 13, and these front and rear lids 7 and 8 are closed. As a result, the connecting lever 13 connecting the rear lid 8 to the front lid 7 has its abutment portion $13b$ abutting against the tapered portion $3k_1$ formed at the lever guide portion $3k$ of the lower half member 3 so that the rear lid 8 is suspended in a form of "dog leg" shape toward the lower opening $3a$ by means of the connecting lever 13 where the connecting lever 13 being restricted from its rotation. Moreover, the bosses $8e_1$ and $8f_1$ formed on the rear lid 8 are located in their lower positions being fitted in the paired guide grooves $3i_1$ and $3j_1$.

In the state where the rear lid 8 is suspended on the front lid 7 by means of the connecting lever 13, moreover, the biasing force by the aforementioned torsion spring 12 is the first bias device for biasing the rear lid 8 suspended on the connecting lever 13 in the opening direction when in the later-described lid opening action. In this lid opening action, on the other hand, when the front lid 7 and the rear lid 8 are widely opened to bring the bosses $8e_1$ and $8f_1$ of the rear lid 8 apart from the guide grooves $3i_1$ and $3j_1$, the biasing force of the aforementioned torsion spring 15 is the second bias device for biasing the rear lid 8 toward the connecting lever 13.

Here will be described in detail the lid opening (or closing) action of the tape cassette 303 thus constructed according to third embodiment of the present invention with reference to FIGS. 8(A) to 8(D).

Figure 8A:
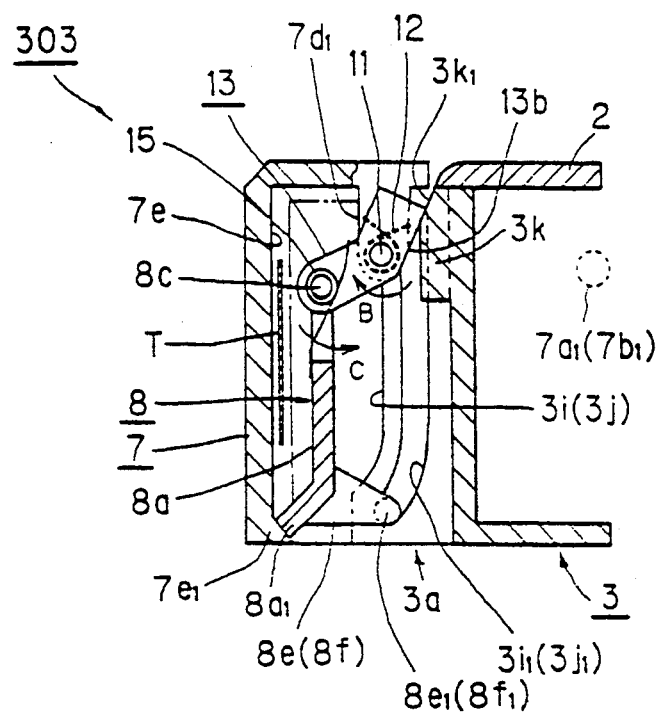
FIG. 8(A) is a view showing the closed state, in which the front lid and the rear lid for explaining the lid closing action of the tape cassette according to the third embodiment of the present invention.
Figure 8B:
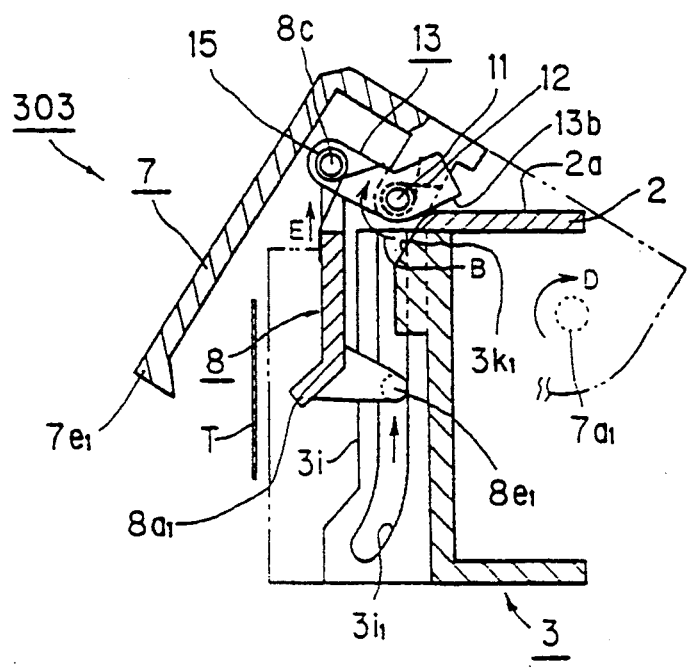
FIG. 8(B) is a view showing the state, in which the front lid and the rear lid are being closed, for explaining the lid closing action of the tape cassette according to the third embodiment of the present invention.
Figure 8C:
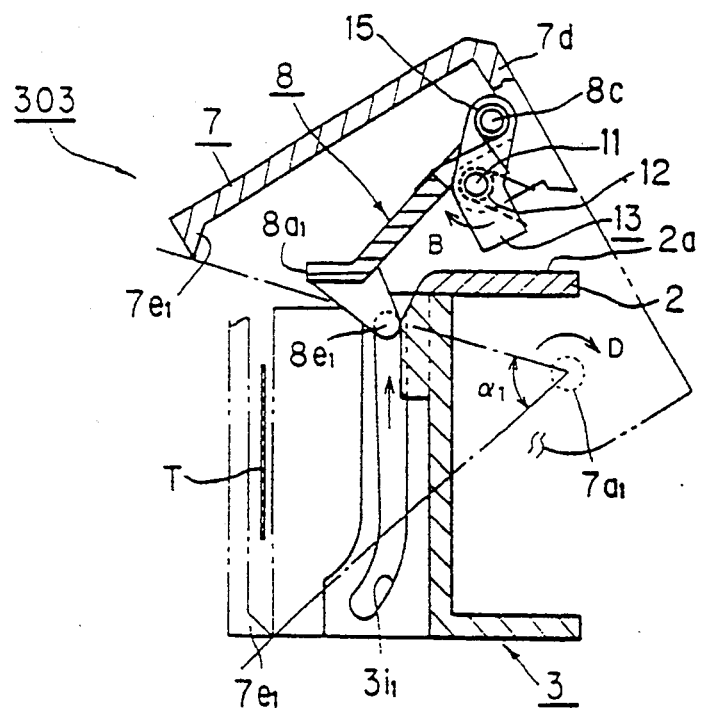
FIG. 8(C) is a view showing a first lid open state, in which the front lid and the rear lid have smaller open angles, for explaining the lid closing action of the tape cassette according to the third embodiment of the present invention.
Figure 8D:
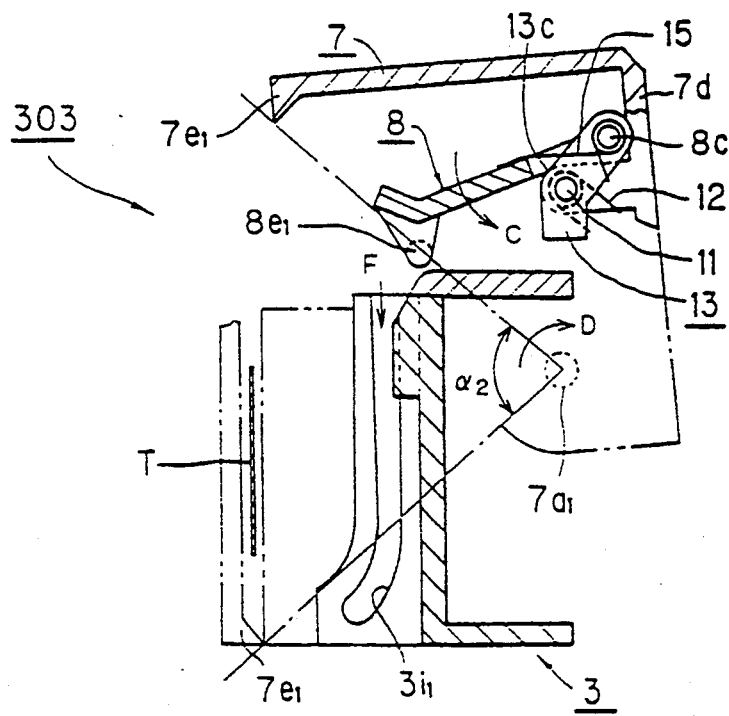
FIG. 8(D) is a view showing a second lid open state, in which the front lid and the rear lid have larger open angles, for explaining the lid closing action of the tape cassette of according to the closing action of a tape cassette the third embodiment of the present invention.

FIGS. 8(A) to 8(D) are vertical sections taken in the direction of arrows VIII—VIII of FIG. 5(B) for explaining the lid opening actions of the tape cassette according to the third embodiment of the present invention. FIG. 8(A) shows the state in which the front lid and the rear lid are closed; FIG. 8(B) shows the state in which the front lid and the rear lid are at interim positions; FIG. 8(C) shows a first open position state in which the front lid and the rear lid have smaller open angles; and FIG. 8(D) shows a second open position state in which the front lid and the rear lid have larger open angles. Incidentally, the parenthesized reference characters appearing in FIG. 8(A) show the opposite portions, but their description will be omitted.

In the state shown in FIG. 8(A), the front lid 7 and the rear lid 8 of the tape cassette 303 of the third embodiment are closed, and the magnetic tape T is loaded along the back side 7e of the front lid 7. In the opening 3a of the lower half member 3, on the other hand, the connecting lever 13 is rotatably hinged to the shaft 11 which is fixed on the lever support portion $7d_1$ of the front lid 7, and the rear lid 8 is rotatably connected to the one end portion of the connecting lever 13 by means of its integrated pin 8c.

At this time, the connecting lever 13 is biased clockwise (i.e., in the direction of arrow B) around the shaft 11 by the torsion spring 12 but has its abutment portion 13b abutting against the tapered portion $3k_1$ of the lever guide portion 3k. As a result, the connecting lever 13 is restricted from its rotation so that the rear lid 8 is suspended by means of the connecting lever 13 in the vicinity of the back face of the magnetic tape T.

Moreover, although the rear lid 8 is biased counterclockwise (i.e., in the direction of arrow C) of the Drawing on the pin 8c by the torsion spring 15, the boss (or engagement portion) $8e_1$ formed on the rear lid 8 is positioned in the lower position while being engaged with (or fitted in) the guide groove $3i_1$ formed in the projection 3i of the aforementioned lower half member 3.

Moreover, the lower end portion $8a_1$ of the rear lid 8 is in close abutment against the triangular portion $7e_1$ formed at the front lid 7 so that the magnetic tape T is protected against the dust or fingerprints from the opening 3a. Specifically, the magnetic tape T has its magnetic face covered with the front lid 7, its back face covered with the rear lid 8 and its lower end wrapped by the lower end portion $8a_1$ of the rear lid 8 and the triangular portion $7e_1$ formed at the front lid 7.

As a result, the magnetic tape T is completely protected between the front lid 7 and the rear lid 8 when the front lid 7 and the rear lid 8 are closed, namely before the tape cassette 303 is loaded to the (not-shown) magnetic recording and/or playback apparatus.

Next, when the tape cassette 303 is inserted into the (not-shown) magnetic recording and/or playback apparatus, as shown in FIG. 8(B), the front lid 7 is opened clockwise (i.e., in the direction of arrow D) of the Drawing on the pin $7a_1$.

At this time, as the front lid 7 is opened, the abutment portion 13b of the connecting lever 13 is released from its abutment against the tapered portion $3k_1$ formed at the lever guide portion 3k so that the connecting lever 13 comes into abutment against the upper side 2a of the upper half member 2 while being rotated clockwise (i.e., in the direction of arrow B) on the shaft 11 by the biasing force of the torsion spring 12. As a result, the rear lid 8 connected to the one end portion of the connecting lever 13 with the pin 8c is raised (i.e., in the direction of arrow E) and opened by the biasing force of the torsion spring 12 while rotating on the pin 8c, and the boss $8e_1$ formed on the rear lid 8 slides upward in the guide groove $3i_1$.

As a result, in association with the opening action of the front lid 7, the rear lid 8 suspended by the front lid 7 by means of the connecting lever 13 is also opened. However, since the connecting lever 13 is made rotatable clockwise (i.e., in the direction of arrow B) on the shaft 11 with respect to the front lid 7 and since the rear lid 8 is made rotatable on the pin 8c with respect to the connecting lever 13, the rear lid 8 can be opened freely, when in the opening action, by the two fulcrums (11, 8c) of rotation so that it can achieve two phases of freedom in the link mechanism.

On the other hand, since the triangular portion $7e_1$ of the front lid 7 is moved apart, when the front lid 7 and the rear lid 8 are opened, from the magnetic face of the magnetic tape T, whereas the lower end portion $8a_1$ of the rear lid 8 is kept away from contact with the back face of the magnetic tape T because the boss $8ei$ is guided by the guide groove $3i_1$.

Next, when the front lid 7 is opened further clockwise (i.e., in the direction of arrow D) on the pin $7a_1$, as shown in FIG. 8(C), it comes to the first open position state having a smaller open angle $a_1$, and the rear lid 8 associated with the front lid 7 is also opened. This first open position state can be applied to the apparatus of the type such as the portable or video movie apparatus in which the open angle $a_1$ of the front lid 7 cannot be set to a large value.

Specifically, in the state shown in FIG. 8(C), with the opening action of the front lid 7, the connecting lever 13 reaches above the upper side 2a of the upper half member 2 while being rotated further clockwise (i.e., in the direction of arrow B) on the shaft 11 by the biasing force of the torsion spring 12, and the end portion of the connecting lever 13 at the side supporting the rear lid 8c comes into abutment of the back side of the upper side 7d of the front lid 7. On the other hand, the rear lid 8 connected to the one end portion of the connecting lever 13 by means of the pin 8c is further raised while being rotated on the pin 8c and so that the boss $8c_1$ formed on the rear lid 8 reaches the upper portion in the guide groove $3i_1$. At this time, as in the foregoing description, the front lid 7 and the rear lid 8 are opened without any contact with the magnetic tape T, and the rear lid 8 suspended by the front lid 7 by means of the connecting lever 13 is given the degrees of freedom by means of the connecting lever 13 by the two fulcrums of rotation (11, 8c). As a result, the rear lid 8 is troublelessly lifted to the vicinity of the inner surface of the upper side 7d of the front lid 7, and the open angle $a_1$, of the front lid 7 can be set to a small value, e.g., about 60 to 65 degrees, as shown. In the apparatus of the type such as the small-sized, lightweight portable or video movie apparatus, the front lid 7 and the rear lid 8 may be opened in that state.

Next, when the front lid 7 is opened further clockwise (i.e., in the direction of arrow D) from the state of FIG. 8(C) on the pin $7a_1$, as shown in FIG. 8(D), it takes a second open position state having a larger open angle $\alpha_2$, and the rear lid 8 associated with the front lid 7 is also opened. This second open position state can be applied to the apparatus of the type such as a large-sized deck or apparatus for professional use, in which the open angle $\alpha_2$ of the front lid 7 can be set to a larger value.

Specifically, in the state shown in FIG. 8(D), the rear lid 8 is also lifted highly, as shown, and its boss $8e_1$ comes out of the upper portion of the guide groove $3i_1$ so that the rear lid 8 is released from its regulation of the guide groove $3i_1$. In this state, the end portion of the connecting lever 13 supporting the rear lid 8 is in abutment against the inner surface of the upper side 7d of the front lid 7, as in the state shown in FIG. 8(D), and the rear lid 8 is biased counter-clockwise (i.e., in the direction of arrow C) of the drawing on the pin 8c by the action of the torsion spring 15 so that the rear lid 8 is rotated toward the connecting lever 13. After this, the rear lid 8 comes into abutment of the stopper portion 13c of the connecting lever 13 so that it is held snugly while having its position restricted. In this state, the open angle $\alpha_2$ of the front lid 7 can be set to the larger value, and the front lid 7 and the rear lid 8 of the apparatus of the type such as the large-sized deck or the apparatus for professional use may be opened in that state.

Incidentally, when the front lid 7 is closed counter-clockwise on the pin $7a_1$ in the direction contrary to the aforementioned lid opening action, the boss $8e_1$ of the rear lid 8 moves in the direction of arrow F into the guide groove $3i_1$ so that the front lid 7 and the rear lid 8 are closed while the boss $8e_1$ being restricted again by the guide groove $3i_1$, although these detailed operation are omitted.

In the tape cassette 303 thus far described in detail according to the third embodiment, before the tape cassette 303 is inserted into the (not-shown) magnetic recording and/or playback apparatus, the magnetic tape T can be protected between the front lid 7 and the rear lid 8 against invasion of dust and fingerprints and further against foreign objects.

In summary, when the tape cassette 303 is inserted into the magnetic recording and/or playback apparatus, an proved degree of freedom can be obtained in the opening (or closing) action of the rear lid 8 to be opened (or closed) together with the front lid 7 than in case of the 8 mm tape cassette of the prior art, in which the rear lid 206 is directly suspended by the front lid 205, because the rear lid 8 is suspended by the front lid 7 by means of the connecting lever 13. As a result, the rear lid 8 can be opened (or closed) without any troubles.

When the front lid 7 and the rear lid 8 are opened but now widely with the rear lid 8 being suspended on the front lid 7 through the connecting lever 13, the biasing force by the first bias device (i.e., the torsion spring 12) biases the rear lid 8 suspended on the connecting lever 13 in the opening direction. Moreover, when the front lid 7 and the rear lid 8 are widely opened so that the bosses (or engagement portions) $8e_1$ and $8f_1$ of the rear lid 8 come out of the guide grooves (or guide portions) $3i_1$ and $3j_1$ of the casing 1A, the biasing force of and the second bias device (i.e., the torsion spring 15) biases the rear lid 8 toward the connecting lever 13 which in rotate is biased by the first bias device. (i.e., the torsion spring 12). Thus, the tape cassette 303 according to the third embodiment can be advantageously applied not only to the apparatus of the type such as the portable or video movie apparatus, in which the open angle $\alpha_1$ of the front lid 7 cannot be set to a large value, but also to the apparatus of the type such as the large-sized deck or the apparatus for professional use, in which the open angle $\alpha_2$ of the front lid 7 can be set to a large value.

Incidentally, the aforementioned tape cassette 303 of the third embodiments equipped with only one connecting lever 13 for connecting the rear lid 8 to the front lid 7 and only one lever guide portion 3k for regulating the connecting lever 13. Despite this construction, however, the connecting lever 13 and the lever guide portion 3k should not be limited thereto, but two sets may be provided in the vicinity of the righthand and lefthand two ends of the rear lid 8. In addition, the paired guide grooves $3i_1$ and $3j_1$ for fitting therein the bosses $8e_1$ and $8f_1$ formed on the rear lid 8 may also be located in the vicinity of the righthand and lefthand ends of the rear lid 8.

<Construction and Lid Opening Actions of Tape Cassette according to Fourth Embodiment>

First of all, the major components for supporting the front lid 7 and the rear lid 8 constituting an essential portion of a tape cassette 304 according to the fourth embodiment of the present invention will be briefly described with reference to FIGS. 4(C) and 5(C).

Figure 4C:
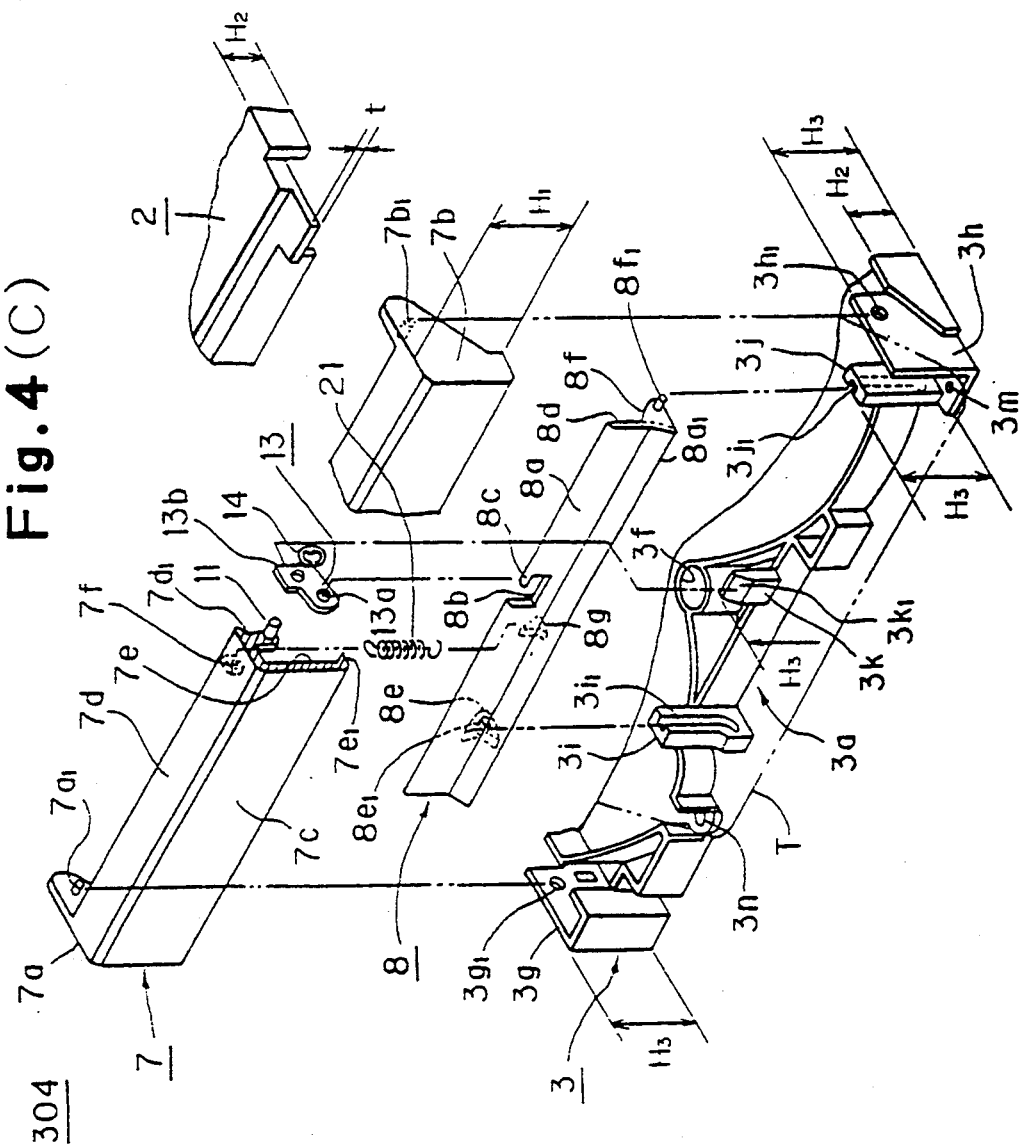
FIG. 4(C) is a partially broken, exploded perspective view showing the area in the vicinity of a front lid and a rear lid constituting an essential portion of a tape cassette according to a fourth embodiment of the present invention.
Figure 5C:
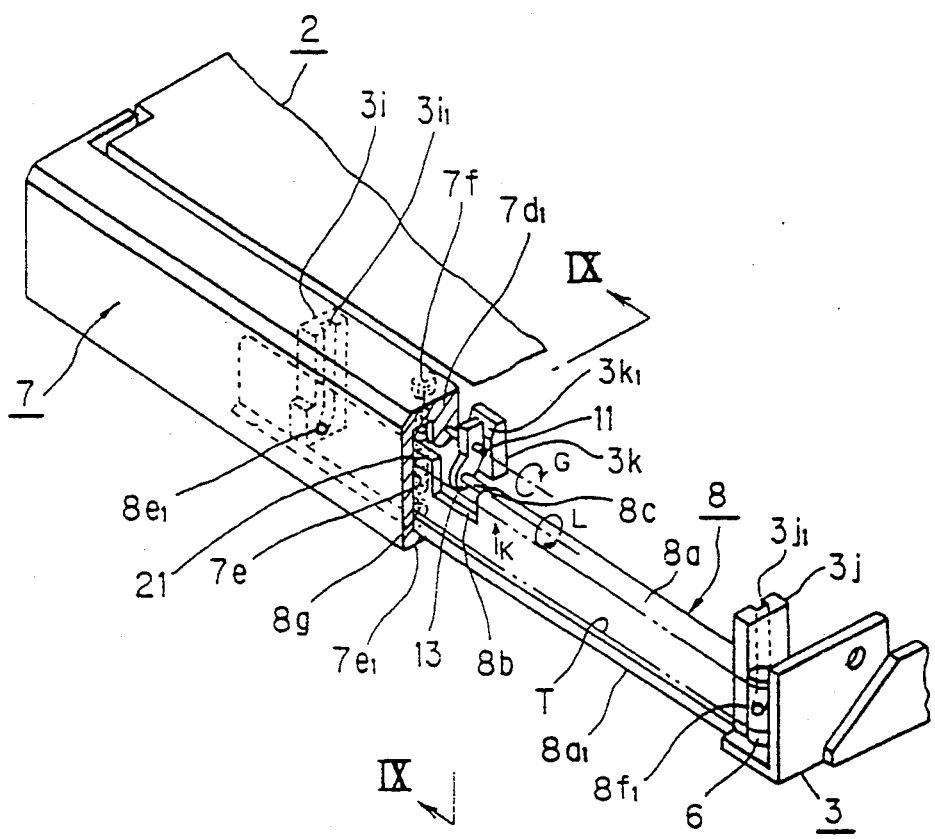
FIG. 5(C) is a partially broken perspective view showing in an assembled state the area in the vicinity of the front lid and the fear lid constituting an essential portion of the tape cassette according to the fourth embodiment of the present invention.

FIG. 4(C) is a partially broken, exploded perspective view showing the vicinity of the front lid and the rear lid constituting an essential portion of the tape cassette according to the fourth embodiment of the present invention; and FIG. 5(C) is a partially broken perspective view showing in an assembled state the front lid and the rear lid constituting essential portions of the tape cassette according to the fourth embodiment of the present invention.

The tape cassette 304 according to the fourth embodiment of the present invention has a construction similar to that of the aforementioned tape cassette 303 of the third embodiment excepting a portion. Here, for conveniences of description, the same components as those described are designated at the common reference characters, and their detailed description is omitted. The aforementioned components are suitably described, if necessary, and the components different from those of the aforementioned embodiments are designated at new reference characters and described.

The tape cassette 304 of the fourth embodiment has a construction different from that of the tape cassette 303 of the third embodiment resides in that both the first bias device for biasing the connecting lever 13 in the third embodiment by the torsion spring 12 and the second bias device for biasing the rear lid 8 by the torsion spring 15 in the third embodiment are eliminated and replaced in the fourth embodiment by a single tension spring 21 interposed between the front lid 7 and the rear lid 8 for biasing the rear lid 8 and the connecting lever 13 thereby to effect lid opening (closing) actions similar to those of the third embodiment.

Specifically, as shown in FIG. 4(C), the tension spring 21 is retained between the spring retaining portion 7f formed on the back side of the upper side 7d of the front lid 7 and the spring retaining portion 8g formed on the back side of the rear lid 8. By retaining the tension spring 21 as above, an oblique upward and backward biasing force is applied to the rear lid 8, as shown in FIG. 5(C), with the assembly in which the rear lid 8 is suspended on the front lid 7 by means of the connecting lever 13. As a result, the biasing force (i.e., its component) of the tension spring 21 is transmitted from the rear lid 8 to the connecting lever 13. Specifically, the component of biasing force of the tension spring 21 biases not only the connecting lever 13 clockwise (i.e., in the direction of arrow G) of the Drawing on the shaft 11 but also the rear lid 8 upward (i.e., in the direction of arrow K) and counter-clockwise (i.e., in the direction of arrow L) of the Drawing on the pin 8c.

As a result, when in the aforementioned lid opening action, the biasing force of the aforementioned tension spring 21 biases the rear lid 8 suspended on the connecting lever 13 in the opening direction. Moreover, when the front lid 7 and the rear lid 8 are widely opened to release the bosses $8e_1$ and $8f_1$ of the rear lid 8 from the guide grooves $3i_1$ and $3j_1$, the biasing force by the tension spring 21 biases the rear lid 8 toward the connecting lever 13.

Here, the lid opening actions of the tape cassette 304 thus constructed according to the fourth embodiment of the present invention are made similar to those of the third embodiment and will be briefly described with reference to FIG. 9(A) to 9(D).

Figure 9:
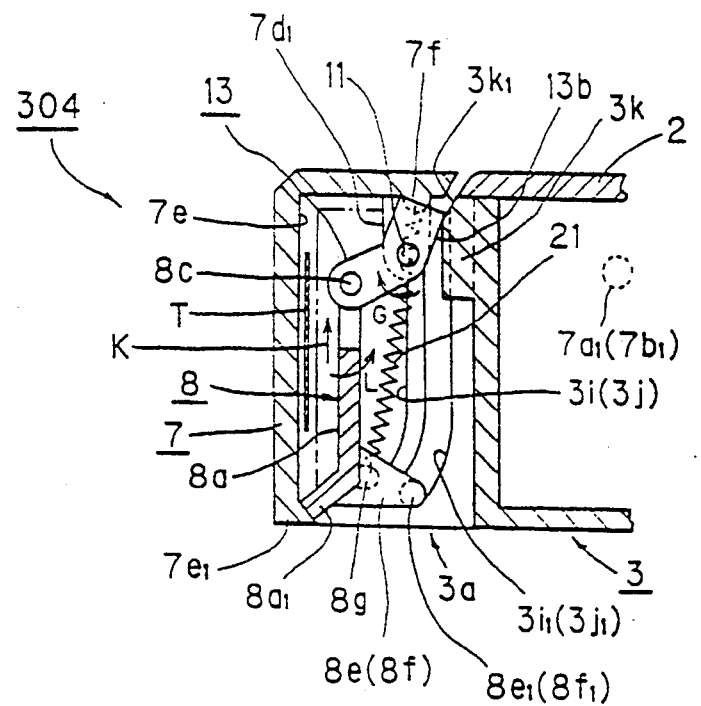
FIGS. 9(A)–9(D) are sectional views taken along the line IX—IX of FIG. 5(C).
Figure 9:
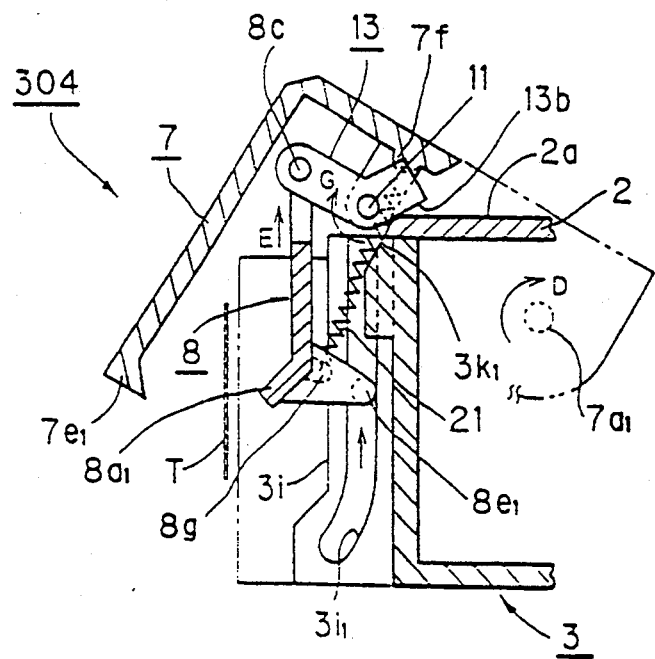
Figure 9C:
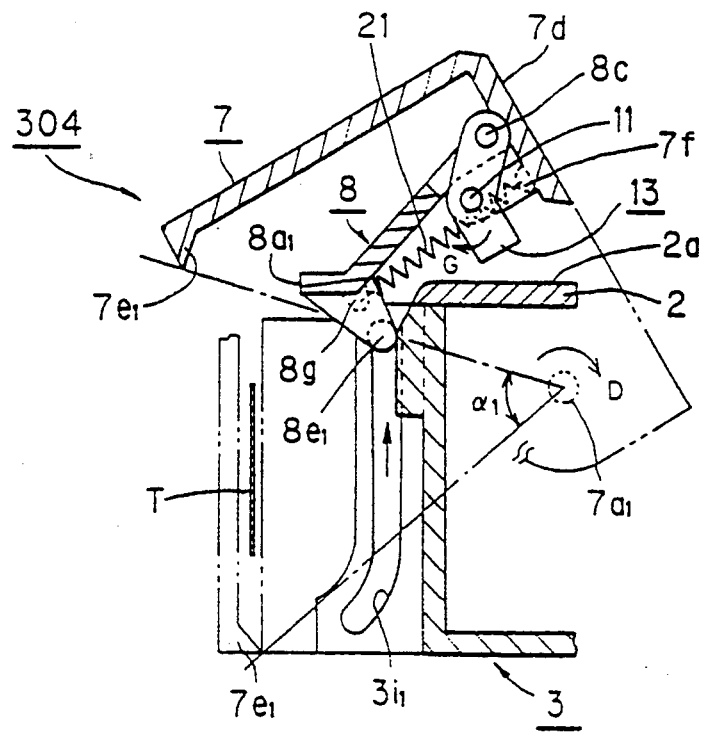
Figure 9D:
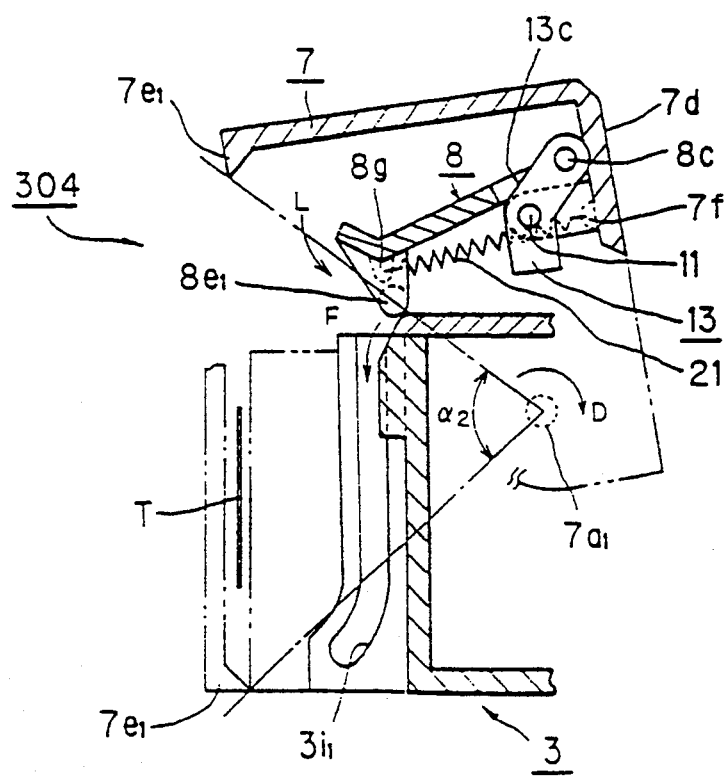

FIGS. 9(A) to 9(D) are longitudinal sections taken in the direction of arrows IX—IX of FIG. 5(B) for explaining the lid opening actions of the tape cassette according the fourth embodiment of the present invention. FIG. 9(A) shows the state in which the front lid and the rear lid are closed; FIG. 9(B) shows the state in which the front lid and the rear lid are being opened; FIG. 9(C) shows a first open position state in which the front lid and the rear lid have smaller open angles; and FIG. 9(D) shows a second open position state in which the front lid and the rear lid have larger open angles.

In the state shown in FIG. 9(A), the front lid 7 and the rear lid 8 of the tape cassette 304 of the fourth embodiment are closed, and the rear lid 8 suspended on the front lid 7 by means of the connecting lever 13 is biased obliquely upward and backward by the tension spring 21. However, the connecting lever 13 has its abutment portion 13b abutting against the tapered portion $3k_1$ of the lever guide portion $3k$ that it is restricted from its rotation. As a result, the rear lid 8 is suspended in the vicinity of the back side of the magnetic tape T by means of the connecting lever 13 to have its boss $8e_1$ positioned in the lower portion of the guide groove $3i_1$.

Next, when the tape cassette 304 is inserted into the (not-shown) magnetic recording and/or playing apparatus, as shown in FIG. 9(B), the front lid 7 is opened clockwise (i.e., in the direction of arrow D) of the Drawing on the pin $7a_1$.

At this time, as the front lid 7 is opened, the abutment portion 13b of the connecting lever 13 is released from its abutment against the tapered portion $3k_1$ formed at the lever guide portion $3k$ so that the connecting lever 13 comes into abutment against the upper side 2a of the upper half member 2 while being rotated clockwise (i.e., in the direction of arrow G) on the shaft 11 by the biasing force of the tension spring 21. As a result, the rear lid 8 connected to the one end portion of the connecting lever 13 by means of the pin 8c is raised (i.e., in the direction of arrow E) while rotating on the pin 8c, and the boss $8e_1$ formed on the rear lid 8 slides upward in the guide groove $3i_1$.

In this fourth embodiment, too, since the rear lid 8 is made rotatable on the pin 8c with respect to the connecting lever 13, the rear lid 8 can be opened without difficulties and freely, when in the opening action, by the two fulcrums (11, 8c) of rotation so that it can achieve two degrees of freedom in the link mechanism.

Next, when the front lid 7 is opened further clockwise (i.e., in the direction of arrow D) on the pin $7a_1$, as shown in FIG. 9(C), it comes to the first open position state having a smaller open angle $\alpha_1$, and the rear lid 8 associated with the front lid 7 is also opened. This first open position state of the front lid 7 and the rear lid 8 can be applied to the apparatus of the type such as the small-sized, lightweight portable or video movie apparatus in which the open angle $\alpha_1$ of the front lid 7 cannot be set to a large value.

Specifically, in the state shown in FIG. 9(C), the connecting lever 13 reaches above the upper side 2a of the upper half member 2 while being rotated further clockwise (i.e., in the direction of arrow G) on the shaft 11 by the biasing force of the tension spring 21, and the end portion of the connecting lever 13 at the side supported by the pin 8c comes into abutment of the inner surface of the upper side 7d of the front lid 7. On the other hand, the rear lid 8 connected to the one end portion of the connecting lever 13 by means of the pin 8c is further raised while being rotated on the pin 8c and so that the boss $8e_1$ formed on the rear lid 8 reaches the upper portion in the guide groove $3i_1$.

Next, when the front lid 7 is opened further clockwise (i.e., in the direction of arrow D) from the state of FIG. 9(C) on the pin $7a_1$, as shown in FIG. 9(D), it takes a second open position state having a larger open angle $60_2$, and the rear lid 8 associated with the front lid 7 is also opened. The second open position state of the front lid 7 and the rear lid 8 can be applied to the apparatus of the type such as a large-sized deck or apparatus for professional use, in which the open angle $\alpha_2$ of the front lid 7 can be set to a larger value.

Specifically, in the state shown in FIG. 9(D), the rear lid 8 is also lifted highly, as shown, and its boss $8e_1$ comes out of the upper portion of the guide groove $3i_1$ so that the rear lid 8 is released from its regulation of the guide groove $3i_1$. In this state, the end portion of the connecting lever 13 supported by the pin 8c is in abutment against the inner surface of the upper side 7d of the front lid 7, as in the state shown FIG. 9(D), and the rear lid 8 is biased counter-clockwise (i.e., in the direction of arrow L) of the Drawing on the pin 8c by the action of the tension spring 21 so that the rear lid 8 is rotated toward the connecting lever 13, and the rear lid 8 comes into abutment of the stopper portion 13c of the connecting lever 13 so that it is held snugly while having its position restricted.

The tape cassette 304 thus far described in detail according to the fourth embodiment has effects substantially similar to those of the third embodiment. Specifically, like the tape cassette 303 of the third embodiment, by the bias device (i.e., the tension spring 21) interposed between the front lid 7 and the rear lid 8 for biasing the rear lid 8, the tape cassette 304 of the fourth embodiment can be advantageously applied not only to the apparatus of the type such as the portable or video movie apparatus, in which the open angle $\alpha_1$ of the front lid 7 cannot be set to a large value, but also to the apparatus of the type such as the large-sized deck or the apparatus for professional use, in which the open angle $\alpha_2$ of the front lid 7 can be set to a large value.

Moreover, since the bias device (i.e., the tension spring 21) for biasing the rear lid 8 and the connecting lever 13 is single, the tape cassette 304 has its structure so simplified that it can be provided at a reasonable cost.

<Construction of Tape Cassette of Fifth Embodiment>

Figure 5D:
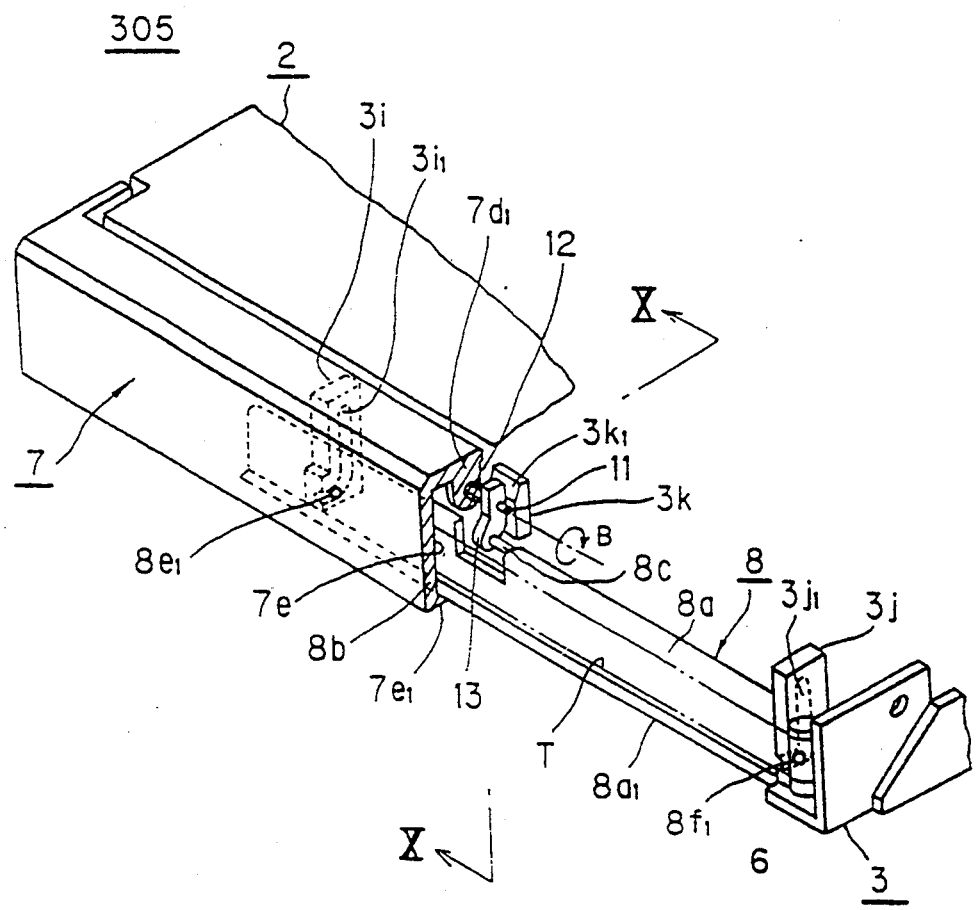
FIG. 5(D) is a partially broken perspective view showing in an assembled state the area in the vicinity of the front lid and the fear lid constituting an essential portion of the tape cassette according to the fifth embodiment of the present invention.

FIG. 4(D) is a partially broken, exploded perspective view showing the vicinity of the front lid and the rear lid constituting an essential portion of the tape cassette according to a fifth embodiment of the present invention, and FIG. 5(D) is a partially broken perspective view showing in the assembled state the vicinity of the front lid and the rear lid constituting the essential portion of the tape cassette according to the fifth embodiment of the present invention.

Here will be described a main construction member constituting the essential portion of the fifth embodiment of the present invention for supporting the front lid 7 and the rear lid 8 with reference to FIG. 4(D).

As shown in FIG. 4(D), with some exceptional portions the upper half member 2 and the lower half member 3 are individually formed and are separated at a height $H_2$ which is about one half of the height $H_1$ of the front lid 7 being substantially equal to that of the tape cassette 305 (or 300 in FIG. 3).

Moreover, the lefthand and righthand sides $3g$ and $3h$ of the lower half member 8 have a height $H_3$ slightly lower than the height $H_1$ of the front lid 7 and are formed with a pair of opposed holes $3g_1$ and $3h_1$. Fitted in these paired holes $3g_1$ and $3h_1$, are paired pins $7a_1$ and $7b_1$ which are so formed integrally with the inner walls of the lefthand and righthand sides of the front lid 7 that they are opposed to each other. Thus, the front lid 7 is supported in the openable and closable manners on the pins $7a_1$ and $7b_1$.

On the other hand, the lower half member 3 is formed in its front side with the opening $3a$ having such a space for admitting the (not-shown) tape loading members. At the lefthand and righthand inner sides of the opening $3a$, there are formed a pair of projections $3i$ and $3j$ which are spaced and opposed at a spacing each other. These projections $3i$ and $3j$ are projected upward with the height $H_3$ which is slightly lower than the height $H_1$ of the front lid 7. The projection $3i$ is offset slightly to the lefthand side of the center portion of the lower half member 3, whereas the projection $3j$ is located in the vicinity of the righthand side $3h$.

Moreover, the paired lefthand and righthand projections $3i$ and $3j$ are formed with a pair of opposed guide portions $3i_1$ and $3j_1$ (as will be called the "guide grooves") which are "boot-shaped" grooves directed downward.

Incidentally, the paired projections $3i$ and $3j$ in the opening $3a$ are so disposed that the rear lid 8 can be opened without any abutment against them when in the later-described lid opening action.

Moreover, on approximate center of the lower half member 3 and inside of the opening $3a$, and between the lefthand projection $3i$ and the righthand projection $3j$, there is formed a regulate portion $3k$ (as will be called the "lever guide portion $3k$") which is projected upward to have the height $H_3$ slightly lower than the height $H_1$ of the front lid 7. The lever guide portion $3k$ has its upper leading end portion tapered, as at $3k_1$. This tapered portion $3k_1$ can be abutted by an abutment portion $13b$ of a connecting lever 13, which is supported by the front lid 7, as will be described hereinafter, so that it regulates the rotation of the connecting lever 13 when in the lid closing action.

On the other hand, the bottom of the lower half member 3 is formed at its front side with holes $3m$ and $3n$, in which the guide poles 6 and 9 (as shown in FIG. 3) are planted, so that the magnetic tape T is caused to form tape path, as indicated by double-dotted lines, by the guide poles 6 and 9. Behind of the lever guide portion $3k$, on the other hand, there is formed the aforementioned hole $3f$, which is allows the (not-shown) light emitting element to enter. The hole $3f$ is located generally at the center portion of the lower half member 3.

The aforementioned lefthand and righthand sides $3g$ and $3f$, projections $3i$ and $3j$ and lever guide portion $3k$ formed at the lower half member 3 are the portions to be associated with the opening actions of the front lid 7 and the rear lid 8, as will be described hereinafter, so that they are formed integrally with the lower half member 3 with the height $H_3$ slightly lower than the height $H_1$ of the front lid 7 so as to keep the excellent positioning accuracies of the front lid 7 and the rear lid 8. However, their formations should not be limited to the above specified ones but they may be formed either concurrently in the identical positional relations at the upper half member 2 or separately in the identical positional relations at the upper and lower half members 2 and 3. Moreover for assembling, the upper half member 2 with the lower half member 3, the upper half member 2 has a thinner part of thickness when the lefthand and righthand sides $3g$ and $3h$, the projections $3i$ and $3j$ and the lever guide portion $3k$ are formed to have the height $H_3$.

Next, between the lefthand and righthand sides $7a$ and $7b$ of the front lid 7 are extended into a right angle direction to a front side $7c$ and an upper side $7d$ forming an "inverted L-shape", and the front side $7c$ has its lower end slightly extended to form a triangular (sectional view) portion $7e_1$ at a back side $7e$. The triangular portion $7e_1$ has a function to wrap the lower end of the magnetic tape T, which is loaded along the front lid 7, in a sealed state together with a later-described lower end portion $8a_1$ of the rear lid 8, when in the lid closing action. Thus, the triangular portion $7e_1$ protects the magnetic tape T in a state isolated from the opening $3a$.

At the back side of the center portion of the front lid 7, on the other hand, there depends from the back of the upper side $7d$ a support portion $7d_1$ (as will be called the "lever support portion $7d_1$"), having a shaft 11. To this shaft 11, moreover, there is hinged the connecting lever 13 having a "dog leg" shape, which is urged by a torsion spring 12 to rotate on the shaft 11 in the clockwise direction (i.e., in the direction of arrow B) of the drawing. On the distal end of the shift 11, there is fitted a snap ring 14 for retaining the connecting lever 13 to prevent it from coming off the shaft 11.

On the other hand, the connecting lever 13 is formed at its lower end portion with a hole $13a$ for suspending rotatably the rear lid 8 in and at its other upper end portion across the shaft 11 additionally formed with an abutment portion $13b$ for abutting against the tapered portion $3k_1$ of the lever guide portion $3k$ formed at the lower half member 3.

The aforementioned connecting lever 13 is one of the members constituting the essential portion of the present invention. The connecting lever 13 enables the rear lid 8 to rotate with respect to the front lid 7. Thanks to the provision of the connecting lever 13, the degree of freedom of the opening (or closing) action of the rear lid 8 is increased, as will be described hereinafter, so that the rear lid 8 can be opened without opening the front lid 7 widely.

Next, the front side $8a$ of the rear lid 8 facing the front lid 7 is formed into the "dog leg" shape, and the rear lid 8 is suspended in parallel with the front lid 7 by means of the connecting lever 13, at the back of the front lid 7 and the magnetic tape T. When in the closing action, the lower end portion $8a_1$ of the front side $8a$ comes into abutment against the triangular portion $7e_1$ formed at the front lid 7, to protect the lower end of the magnetic tape T.

Specifically, the rear lid 8 has at its central upper portion, the L-shaped recess $8b$ defining a pin $8c$ projecting leftward. If the one end portion of the aforementioned connecting lever 13 is inserted in that recess $8b$ to fit the pin $8c$ in the hole $13a$ formed in the connecting lever 13, the rear lid 8 is connected in a suspended state to the front lid 7 by means of the connecting lever 13 and is allowed to rotate on the pig $8c$.

Moreover, the rear lid 8 is integrally formed, at its back side $8d$ and below its middle portion with a backward projection $8e$ and, at its back side $8d$ and in the vicinity of the righthand side, with a projection $8f$ having a shape identical to that of the projection $8e$. Those projections $8e$ and $8f$ are opposed to each other and formed with guided portions $8e_1$ and $8f_1$ (as will be called the "bosses $8e_1$ and $8f_1$") projected outward.

Moreover, the bosses $8e_1$ and $8f_1$ formed on the rear lid 8 are inserted to engage with the lower ends of the paired guide grooves $3i_1$ and $3j_1$, which are formed in the projections $3i$ and $3j$ of the lower half member 3, so that the rear lid 8 is suspended on the front lid 7 by means of the connecting lever 13. Then, the rear lid 8 is supported on the back face of the magnetic tape T loaded along the front lid 7 and in opening $3a$ of the lower half member 3.

In this state, as shown in FIG. 5(D), the rear lid 8 is assembled with and supported by front lid 7, and these front and rear lids 7 and 8 are closed. As a result, the connecting lever 13 connecting the rear lid 8 to the front lid 7 has its abutment portion $13b$ abutting against the tapered portion $3k_1$ formed at the lever guide portion $3k$ of the lower half member 3 so that the rear lid 8 is suspended in a form of "dog leg" shape toward the lower opening $3a$ by means of the connecting lever 13 where the connecting lever 13 being restricted from its rotation. Moreover, the bosses $8e_1$ and $8f_1$ formed on the rear lid 8 are located in their lower positions being fitted in the paired guide grooves $3i_1$ and $3j_1$.

<Lid Opening Action of Tape Cassette of Fifth Embodiment>

Here will be described the lid opening action of the tape cassette 305 thus constructed according to the fifth embodiment of the present invention with reference to FIGS. 10(A) to 10(D).

FIGS. 10(A) to 10(D) are vertical sections taken in the direction of arrows X—X of FIG. 5(D) for explaining the lid opening actions of the tape cassette according the fifth embodiment of the present invention. FIG. 10(A) shows the state in which the front lid and the rear lid are closed; FIG. 10(B) shows the state in which the front lid and the rear lid are at interim portions; FIG. 10(C) shows the state in which the open angles of the front lid and the rear lid are small; and FIG. 10(D) shows the state in which the open angles of the front lid and the rear lid are large.

Incidentally, the parenthesized reference characters appearing in FIG. 10(A) show the opposite portions, but their description will be omitted.

In the state shown in FIG. 10(A), the front lid 7 and the rear lid 8 of the tape cassette 305 of the fifth embodiment are closed, and the magnetic tape T is loaded along the back side $7e$ of the front lid 7. In the opening $3a$ of the lower half member 3, on the other hand, the connecting lever 13 is rotatably hinged to the shaft 11 which is fixed on the lever support portion $7d_1$ of the front lid 7, and the rear lid 8 is rotatably connected to the one end portion of the connecting lever 13 by means of its integrated pin $8c$.

At this time, the connecting lever 13 is biased clockwise (i.e., in the direction of arrow B) around the shaft 11 by the torsion spring 12 but has its abutment portion $13b$ abutting against the tapered portion $3k_1$ of the lever guide portion $3k$. As a result, the connecting lever 13 is restricted from its rotation so that the rear lid 8 is suspended by means of the connecting lever 13 in the vicinity of the back face of the magnetic tape T.

Moreover, the boss $8e_1$ (or $8f_1$) formed on the rear lid 8 is positioned in the lower position while being fitted in the guide groove $3i_1$ (or $3j_1$) formed in the projection $3i$ (or $3j$) of the aforementioned lower half member 3.

Moreover, the lower end portion $8a_1$ of the rear lid 8 is in close abutment against the triangular portion $7e_1$ formed at the front lid 7 so that the magnetic tape T is protected against the dust or fingerprints from the opening $3a$. Specifically, the magnetic tape T has its magnetic face covered with the front lid 7, its back face covered with the rear lid 8 and its lower end wrapped by the lower end portion $8a_1$ of the rear lid 8 and the triangular portion $7e_1$ formed at the front lid 7.

As a result, the magnetic tape T is completely protected between the front lid 7 and the rear lid 8 when the front lid 7 and rear lid 8 are closed, namely before the tape cassette 305 is loaded to the (not-shown) magnetic recording and/or playing apparatus.

Next, when the tape cassette 305 is inserted into the (not-shown) magnetic recording and/or playing apparatus, as shown in FIG. 10(B), the front lid 7 is opened clockwise (i.e., in the direction of arrow C) on the pin $7a_1$.

Here, as the front lid 7 is opened, the abutment portion $13b$ of the connecting lever 13 hinged to the front lid 7 by means of the shaft 11 is released from its abutment against the tapered portion $3k_1$ formed at the lever guide portion $3k$ so that the connecting lever 13 comes into abutment against the upper side $2a$ of the upper half member 2 while being rotated clockwise (i.e., in the direction of arrow B) on the shaft 11 by the biasing force of the torsion spring 12. As a result, the rear lid 8 connected to the one end portion of the connecting lever 13 with the pin $8c$ is raised while rotating on the pin $8c$, and the boss $8e_1$ formed on the rear lid 8 slides upward in the guide groove $3i_1$.

As a result, in association with the opening action of the front lid 7, the rear lid 8 suspended by the front lid 7 by means of the connecting lever 13 is also opened. However, since the connecting lever 13 is also opened. However, since the connecting lever 13 is made rotatable clockwise (i.e., in the direction of arrow B) on the shaft 11 with respect to the front lid 7 and since the rear lid 8 is made rotatable on the pin $8c$ with respect to the connecting lever 13, the rear lid 8 can be opened freely, when in the opening action, by the two fulcrums (11, $8c$) of rotation so that it can achieve two phases of freedom in the link mechanism.

On the other hand, since the triangular portion $7e_1$ of the front lid 7 is moved apart, when the front lid 7 and the rear lid 8 are opened, from the magnetic face of the magnetic tape T, whereas the lower end portion $8a_1$ of the rear lid 8 is kept away from contact with the back face of the magnetic tape T because the boss $8e_1$ is guided by the guide groove $3i_1$.

Next, in case of application to an apparatus of the type such as a portable video deck or a video movie which cannot set the open angle $\alpha_1$ of the front lid 7 to a large value, the front lid 7 is, as shown in FIG. 10(C), further opened clockwise (i.e., in the direction of arrow C) on the pin $7a_1$, and the rear lid 8 is opened in association with the front lid 7 till the boss $8e_1$ formed on the rear lid 8 reaches the substantially upper end portion of the guide groove $3i_1$. If the opening action of the front lid 7 is interrupted in that state, the open angle $\alpha_1$ of the front lid 7 can be set to a low value.

Specifically, in the shown state, the connecting lever 13 reaches to above the upper side $2a$ of the upper half member 2 while being rotated further clockwise (i.e., in the direction of arrow B) from the position of FIG. 10(B) on the shaft 11 by the biasing force of the torsion spring 12. As a result, the rear lid 8 connected to the one end portion of the connecting lever 13 by means of the pin $8c$ is further raised from the position of FIG. 10(B) while rotating on the pin $8c$, and the boss $8e_1$ formed on the rear lid 8 reaches the substantially upper end portion of the guide groove At this time, like before, the front lid 7 and the rear lid 8 are opened without contact with the magnetic tape T, and the rear lid 8 suspended on the front lid 7 by means of the connecting lever 13 is given the degrees of freedom by the two fulcrums of rotation (11, $8c$), as has been described hereinbefore. As a result, the pin $8c$ connected to the one end portion of the connecting lever 13 is raised troublelessly to the vicinity of the inner surface of the upper side $7d$ of the front lid 7 while suppressing the open angle $\alpha_1$ of the front lid 7 to a small value.

On the other hand, as shown in FIG. 10(D), in case of application to an apparatus of the type such as a video deck of a large size or for professional use in which the open angle $\alpha_2$ of the front lid 7 can be set to a large value, the front lid 7 is opened further clockwise (i.e., in the direction of arrow C) from the position of FIG. 10(C) on the pin $7a_1$, and the rear lid 8 is opened in association with the opening action of the front lid 7 till the boss $8e_1$ formed on the rear lid 8 arrives to abut against the upper end portion of the guide groove $3i_1$. Then, only the front lid 7 is further opened upward by the action of the connecting lever 13.

If the front lid 7 is opened till that state, the open angle $\alpha_2$ of the front lid 7 can be set to a large value. Specifically, in the shown state, since the guide groove $3i_1$ has its upper end portion shut off in advance, the boss $8e_1$ formed on the rear lid 8 is held in the state abutting against the upper end portion of the guide groove $3i_1$ so that the rear lid 8 having been associated with the front lid 7 is held in no more openable position.

In the state where the rear lid 8 is held in the shown open position, on the other hand, only the front lid 7 can be widely opened. Specifically, when in the opening action of the front lid 7, the shaft 11 providing the fulcrum of rotation of the connecting lever 13 is moved rightward, and the pin $8c$ at the one end portion of the connecting lever 13 receives the leftward force from the rear lid 8 to rotate the connecting lever 13 counter-clockwise (i.e., in the direction of arrow D) on the shaft 11 against the biasing force of the torsion spring 12. As a result, the front lid 7 is further opened clockwise (i.e., in the direction of arrow C) so that its open angle $\alpha_2$ exceeds the aforementioned open angle $\alpha_1$.

Incidentally, the closing actions of the front lid 7 and the rear lid 8 are accomplished in the inverted order of the aforementioned ones in the course of FIGS. 10(A), 10(B), 10(C) and 10(D).

As a result, in the tape cassette 305 according to the fifth embodiment, before the tape cassette 305 is inserted into the (not-shown) magnetic recording and/or playing apparatus, the magnetic tape T can be protected between the front lid 7 and the rear lid 8 against dust and fingerprints and further against foreign objects.

In summary, when the tape cassette 305 is inserted into the magnetic recording and/or playback apparatus, an improved degree of the freedom is obtained in the opening (or closing) action of the rear lid 8 to be opened (or closed) together with the front lid 7 than in case of the 8 mm tape cassette of the prior art in which the rear lid 206 is directly suspended by the front lid 205, because the rear lid 8 is suspended by the front lid 7 by means of the connecting lever 13. As a result, the rear lid 8 can be opened (or closed) without any troubles.

In the construction of the tape cassette 305, moreover, the guide grooves (or guide portions) $3i_1$ and $3j_1$ to be engaged by the bosses (or guided portions) $8e_1$ and $8f_1$ formed on the rear lid 8 are formed to shut off the (upper) end portions of the rear lid 8 taken in the opening direction so that the rear lid 8 is not allowed to come out in the opening direction. Thus, the construction of the tape cassette 305 can be advantageously applied not only to the apparatus of the type such as a portable video deck or a video movie in which the front lid cannot have its open angle set to a large value but also to the apparatus of the type such as a video deck of large size or professional use, in which the open angle of the front lid can be set to a large value by the action of the connecting lever 13.

Moreover, that construction can be applied to the magnetic recording and/or playing apparatus while maintaining the interchangeability with the tape cassette of the prior art so that the tape cassette having its quality improved to exert no load upon the user can be provided for the user.

Incidentally, the aforementioned tape cassette 305 is equipped with only one connecting lever 13 for connecting the rear lid 8 to the front lid 7 and only one lever guide portion $3k$ for regulating the connecting lever 13. Despite this construction, however, the connecting lever 13 and the lever guide portion $3k$ should not be limited thereto, but two sets may be provided in the vicinity of the righthand and lefthand two ends of the rear lid 8. In addition, the paired guide grooves $3i_1$ and $3j_1$ for fitting therein the bosses $8e_1$ and $8f_1$ formed on the rear lid 8 may also be located in the vicinity of the righthand and lefthand ends of the rear lid 8.

Still moreover, in the tape cassette 305, the bias means for biasing the rear lid 8 suspended on the connecting lever 13 in the opening direction is exemplified by the torsion spring 12 for biasing the connecting lever 13 clockwise (i.e., in the direction of arrow B) to bias the rear lid 8 in the opening direction. The bias device should not be limited thereto but may be individually exemplified by attaching a member corresponding to the torsion spring 12 directly to the rear lid 8.

What is claimed is:

1. A tape cassette having a casing including an opening for admitting tape loading members of a magnetic recording and/or playing apparatus, a supply reel disposed in said casing for winding and feeding out a magnetic tape, a take-up reel disposed in said casing for taking up the magnetic tape wound on said supply reel along a front of said casing, a front lid disposed in openable/closable manners at the front of said casing for protecting one surface of the magnetic tape at said front of said casing, and a rear lid disposed in said opening and at a back of said front lid and adapted to be opened or closed together with said front lid, said rear lid opposing to another surface of said magnetic tape for protecting said another surface, wherein said tape cassette comprises, a connecting lever pivotally mounted on a shaft supported on a support portion which is integrally formed on the back of said front lid, guide means formed in said casing for engaging with guide pins provided on the rear lid to guide the rear lid in opening/closing directions, the rear lid being rotatably connected to one end portion of said connecting lever so that said rear lid swings to open and close, while being engaged with said guide means.

2. A tape cassette as claimed in claim 1 further comprising first bias means provided between said connecting lever and front lid for biasing said connecting lever in a rotational direction for opening said front lid so as to displace said rear lid towards said support portion.

3. A tape cassette as claimed in claim 2, further comprising regulate means formed in said casing for preventing said connecting lever biased by said first bias means from rotating when said front lid and said rear lid are closed, and for regulating a rotational angle of said connecting lever when said front lid and said rear lid are opened, by causing a part of said connecting lever to abut against said regulate means.

4. A tape cassette as claimed in claim 2 further comprising second bias means interposed between said rear lid and said connecting lever for biasing said rear lid in a direction toward said connecting lever biased by said first bias means, when said front lid is opened to disengage said guide pins of said rear lid from the guide means in said casing.

5. A tape cassette as claimed in claim 4 further comprising regulate means formed in said casing for regulating the opening action of said rear lid biased by said first bias means and said second bias means when said front lid and said rear lid are closed.

6. A tape cassette as claimed in claim 1 further comprising bias means interposed between said front lid and said rear lid for biasing said rear lid suspended from said connecting lever in a rotational direction for opening said front lid and for biasing said rear lid in a direction toward said connecting lever, when said front lid is opened to disengage said guide pins of said rear lid from said guide means in said casing.

* * * * *